(12) United States Patent
Fimoff et al.

(10) Patent No.: US 6,504,872 B1
(45) Date of Patent: Jan. 7, 2003

(54) DOWN-CONVERSION DECODER FOR INTERLACED VIDEO

(75) Inventors: Mark Fimoff, Hoffman Estates, IL (US); Jin H. Kim, Glenview, IL (US); Scott M. LoPresto, Mt. Prospect, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 367 days.

(21) Appl. No.: 09/627,916

(22) Filed: Jul. 28, 2000

(51) Int. Cl.[7] .............. H04N 7/30; H04N 7/32; H04N 7/36; H04N 7/50
(52) U.S. Cl. ............ 375/240.27; 375/240.12; 375/240.21; 375/240.25
(58) Field of Search ........... 375/240.27, 240.25, 375/240.21, 240.12

(56) References Cited

U.S. PATENT DOCUMENTS

| | | | | |
|---|---|---|---|---|
| 5,262,854 A | | 11/1993 | Ng ................... | 375/240.24 |
| 5,737,019 A | * | 4/1998 | Kim .................. | 375/240.25 |
| 6,175,592 B1 | * | 1/2001 | Kim .................. | 375/240.21 |
| RE37,057 E | * | 2/2001 | Lee .................. | 375/240.12 |

* cited by examiner

Primary Examiner—Howard Britton

(57) ABSTRACT

A downsampling apparatus converts a received DCT coefficient macroblock to a reconstructed pixel block and includes an IDCT module that performs an inverse DCT on the received DCT coefficient macroblock to produce a first intermediate block. A horizontal downsampler horizontally downsamples the first intermediate block to produce a second intermediate block. A calculation module calculates first and second errors. The first and second errors are calculated based upon a difference between the first intermediate block and first and second downsampled/upsampled versions of the first intermediate block derived from corresponding first and second vertical downsampling filters. A filtering module vertically downsamples the second intermediate block using the first or second vertical downsampling filter depending upon whether the first or second error is smaller. A motion compensator adds prediction reference pixels to the horizontally and vertically downsampled block, as appropriate, to form reconstructed pixels.

56 Claims, 10 Drawing Sheets

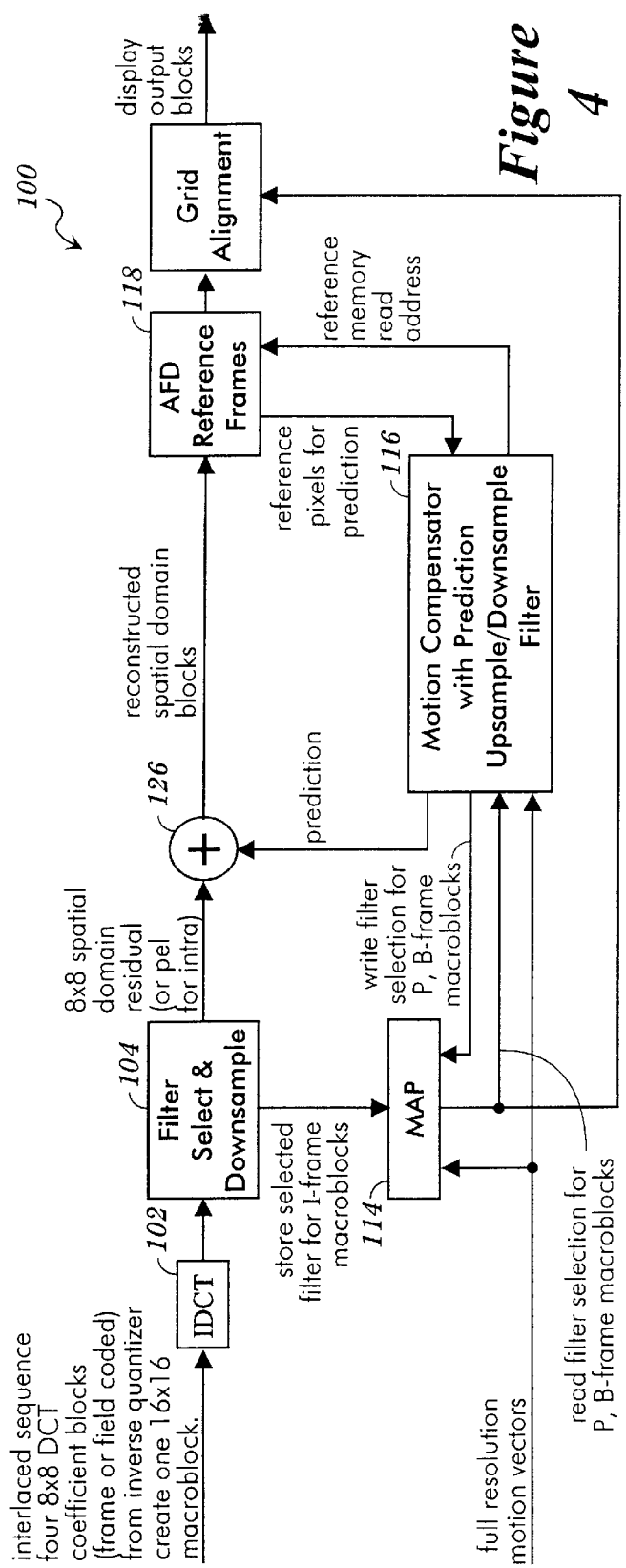
Figure 4
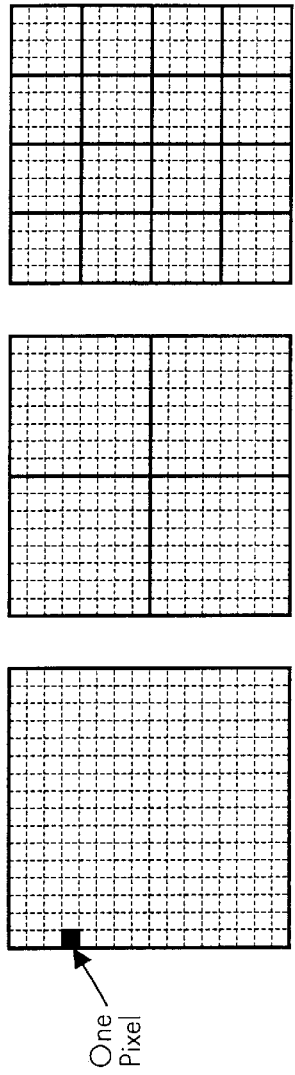
Figure 5A  one macroblock
Figure 5B  four macroblocks
Figure 5C  sixteen nanoblocks

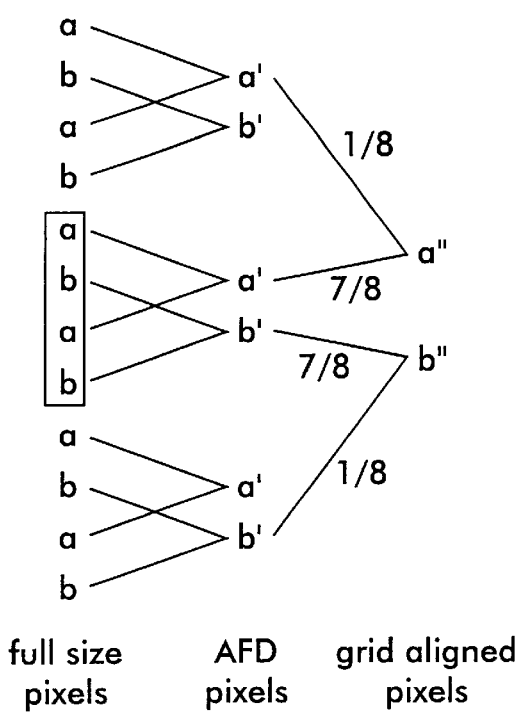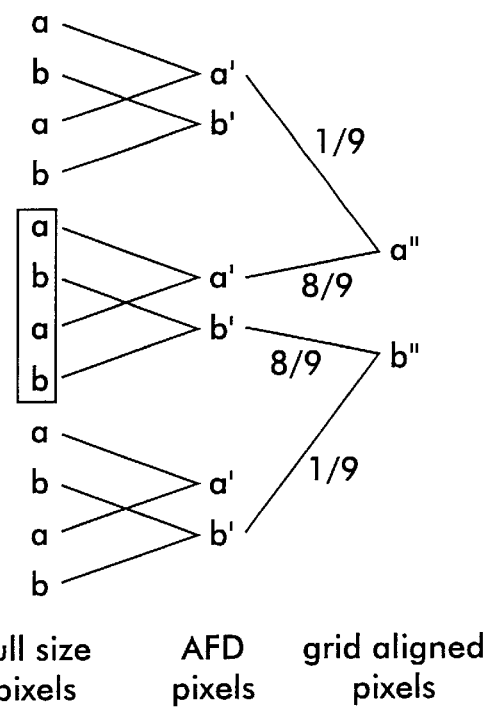
Figure 17A
Figure 17B

DOWN-CONVERSION DECODER FOR INTERLACED VIDEO

RELATED APPLICATION

This application claims subject matter similar to the subject matter disclosed in U.S. patent application Ser. No. 09/106,367 filed Jun. 29, 1998, in U.S. patent application Ser. No. 09/460,645 filed Dec. 15, 1999, in U.S. patent application Ser. No. 09/464,279 filed Dec. 15, 1999, in U.S. patent application Ser. No. 09/106,367 filed Jun. 29, 1998, and in U.S. patent application Ser. No. 09/951,269 filed Oct. 17, 1997.

TECHNICAL FIELD OF THE INVENTION

The present invention relates to a down converting decoder for down converting and decoding high resolution encoded video for display by a lower resolution receiver.

BACKGROUND OF THE INVENTION

The international standard ISO/IEC 13818-2 entitled "Generic Coding of Moving Pictures and Associated Audio Information: Video" and "Guide to the Use of the ATSC Digital Television Standard" describe a system, known as MPEG-2, for encoding and decoding digital video data. The standard allows for the encoding of video over a wide range of resolutions, including higher resolutions commonly known as HDTV. According to this standard, digital video data is encoded as a series of code words in a complicated manner that causes the average length of the code words to be much smaller than would be the case if, for example, each pixel were coded as an eight bit value. This type of encoding is also known as data compression.

In the system described above, encoded pictures are made up of pixels. Each 8×8 array of pixels is known as a block, and a 2×2 array of these 8×8 blocks is termed a macroblock. Compression is achieved using the well known techniques of prediction (motion estimation in the encoder, motion compensation in the decoder), two dimensional discrete cosine transformation (DCT) which is performed on 8×8 blocks of pixels, quantization of DCT coefficients, and Huffman and run/level coding. However, prediction is not used for every picture. Thus, while P pictures are encoded with prediction from previous pictures, and while B pictures are encoded using prediction from either a previous or a subsequent picture, I pictures are encoded without prediction.

An MPEG-2 encoder 10 is shown in simplified form in FIG. 1. Data representing macroblocks of pixels are fed to both a subtractor 12 and a motion estimator 14. In the case of P pictures and B pictures, the motion estimator 14 compares each new macroblock to be encoded with the macroblocks in a reference picture previously stored in a reference picture memory 16. The motion estimator 14 finds the macroblock in the stored reference picture that most closely matches the new macroblock.

The motion estimator 14 reads this matching macro-block (known as a predicted macroblock) out of the reference picture memory 16 and sends it to the subtractor 12 which subtracts it, on a pixel by pixel basis, from the new macroblock entering the MPEG-2 encoder 10. The output of the subtractor 12 is an error, or residual, that represents the difference between the new macroblock being encoded and the predicted macroblock. This residual is often very small. The residual is transformed from the spatial domain by a two dimensional DCT 18. The DCT coefficients resulting from the two dimensional DCT 18 are then quantized by a quantization block 20 in a process that reduces the number of bits needed to represent each coefficient. Usually, many coefficients are effectively quantized to zero. The quantized DCT coefficients are Huffman and run/level coded by a coder 22 which further reduces the average number of bits per coefficient.

The motion estimator 14 also calculates a motion vector (mv) which represents the horizontal and vertical displacements of the predicted macroblock in the reference picture from the position of the new macroblock in the current picture being encoded. It should be noted that motion vectors may have ½ pixel resolution which is achieved by linear interpolation between adjacent pixels. The data encoded by the coder 22 are combined with the motion vector data from the motion estimator 14 and with other information (such as an indication of whether the picture is an I, P or B picture), and the combined data are transmitted to a receiver that includes an MPEG-2 decoder 30 (shown in FIG. 2 and discussed below).

For the case of P pictures, the quantized DCT coefficients from the quantization block 20 are also supplied to an internal decoder loop that represents a portion of the operation of the MPEG-2 decoder 30. Within this internal loop, the residual from the quantization block 20 is inverse quantized by an inverse quantization block 24 and is inverse DCT transformed by an inverse discrete cosine transform (IDCT) block 26. The predicted macroblock, that is read out of the reference picture memory 16 and that is supplied to the subtractor 12, is also added back to the output of the IDCT block 26 on a pixel by pixel basis by an adder 28, and the result is stored back into the reference picture memory 16 in order to serve as a macroblock of a reference picture for predicting subsequent pictures. The object of this internal loop is to have the data in the reference picture memory 16 of the MPEG-2 encoder 10 match the data in the reference picture memory of the MPEG-2 decoder 30. B pictures are not stored as reference pictures.

In the case of I pictures, no motion estimation occurs and the negative input to the subtractor 12 is forced to zero. In this case, the quantized DCT coefficients provided by the two dimensional DCT 18 represent transformed pixel values rather than transformed residual values, as is the case with P and B pictures. As in the case of P pictures, decoded I pictures are stored as reference pictures.

The MPEG-2 decoder 30 illustrated in FIG. 2 is a simplified showing of an MPEG-2 decoder. The decoding process implemented by the MPEG-2 decoder 30 can be thought of as the reverse of the encoding process implemented by the MPEG-2 encoder 10. Accordingly, the received encoded data is Huffman and run/level decoded by a Huffman and run/level decoder 32. Motion vectors and other information are parsed from the data stream flowing through the Huffman and run/level decoder 32. The motion vectors are fed to a motion compensator 34. Quantized DCT coefficients at the output of the Huffman and run/level decoder 32 are fed to an inverse quantization block 36 and then to an IDCT block 38 which transforms the inverse quantized DCT coefficients back into the spatial domain.

For P and B pictures, each motion vector is translated by the motion compensator 34 to a memory address in order to read a particular macroblock (predicted macroblock) out of a reference picture memory 42 which contains previously stored reference pictures. An adder 44 adds this predicted macroblock to the residual provided by the IDCT block 38 in order to form reconstructed pixel data. For I pictures, there is no prediction, so that the prediction provided to the adder 44 is forced to zero. For I and P pictures, the output of the adder 44 is fed back to the reference picture memory 42 to be stored as a reference picture for future predictions.

The MPEG encoder 10 can encode sequences of progressive or interlaced pictures. For sequences of interlaced pictures, pictures may be encoded as field pictures or as frame pictures. For field pictures, one picture contains the odd lines of the raster, and the next picture contains the even lines of the raster. All encoder and decoder processing is done on fields. Thus, the DCT transform is performed on 8×8 blocks that contain all odd or all even numbered lines. These blocks are referred to as field DCT coded blocks.

On the other hand, for frame pictures, each picture contains both odd and even numbered lines of the raster. Macroblocks of frame pictures are encoded as frames in the sense that an encoded macroblock contains both odd and even lines. However, the DCT performed on the four blocks within each macroblock of a frame picture may be done in two different ways. Each of the four DCT transform blocks in a macroblock may contain both odd and even lines (frame DCT coded blocks), or alternatively two of the four DCT blocks in a macroblock may contain only the odd lines of the macroblock and the other two blocks may contain only the even lines of the macroblock (field DCT coded blocks). See ISO/IEC 13818-2, section 6.1.3, FIGS. 6–13 and 6–14. The coding decision as to which way to encode a picture may be made adaptively by the MPEG-2 encoder 10 based upon which method results in better data compression.

Residual macroblocks in field pictures are field DCT coded and are predicted from a reference field. Residual macroblocks in frame pictures that are frame DCT coded are predicted from a reference frame. Residual macroblocks in frame pictures that are field DCT coded have two blocks predicted from one reference field and two blocks predicted from either the same or the other reference field.

For sequences of progressive pictures, all pictures are frame pictures with frame DCT coding and frame prediction.

MPEG-2, as described above, includes the encoding and decoding of video at high resolution (HDTV). In order to permit people to use their existing NTSC televisions so as to view HDTV transmitted programs, it is desirable to provide a decoder that decodes high resolution MPEG-2 encoded data as reduced resolution video data for display on existing NTSC televisions. (Reducing the resolution of television signals is often called down conversion decoding.) Accordingly, such a down converting decoder would allow the viewing of HDTV signals without requiring viewers to buy expensive HDTV displays.

There are known techniques for making a down converting decoder such that it requires less circuitry and is, therefore, cheaper than a decoder that outputs full HDTV resolution. One of these methods is disclosed in U.S. Pat. No. 5,262,854. The down conversion technique disclosed there is explained herein in connection with a down convertor 50 shown in FIG. 3. The down convertor 50 includes a Huffman and run/level decoder 52 and an inverse quantization block 54 which operate as previously described in connection with the Huffman and run/level decoder 32 and the inverse quantization block 36 of FIG. 2. However, instead of utilizing the 8×8 IDCT block 38 as shown in FIG. 2, the down convertor 50 employs a down sampler 56 which discards the forty-eight high order DCT coefficients of an 8×8 block and performs a 4×4 IDCT on the remaining 4×4 array of DCT coefficients. This process is usually referred to as DCT domain down sampling. The result of this down sampling is effectively a filtered and down sampled 4×4 block of residual samples (for P or B pictures) or pixels for I pictures.

For residual samples, a prediction is added by an adder 58 to the residual samples from the down sampler 56 in order to produce a decoded reduced resolution 4×4 block of pixels. This block is saved in a reference picture memory 60 for subsequent predictions. Accordingly, predictions will be made from a reduced resolution reference, while predictions made in the decoder loop within the encoder are made from full resolution reference pictures. This difference means that the prediction derived from the reduced resolution reference will differ by some amount from the corresponding prediction made by the encoder, resulting in error in the residual-plus-prediction sum provided by the adder 58 (this error is referred to herein as prediction error). Prediction error may increase as predictions are made upon predictions until the reference is refreshed by the next I picture.

A motion compensator 62 attempts to reduce this prediction error by using the full resolution motion vectors, even though the reference picture is at lower resolution. First, a portion of the reference picture that includes the predicted macroblock is read from the reference picture memory 60. This portion is selected based on all bits of the motion vector except the least significant bit. Second, this predicted macroblock is interpolated back to full resolution by a 2×2 prediction up sample filter 64. Third, using the full resolution motion vector (which may include ½ pixel resolution), a predicted full resolution macroblock is extracted from the up sampled portion based upon all of the bits of the motion vector. Fourth, a down sampler 66 performs a 2×2 down sampling on the extracted full resolution macroblock in order to match the resolution of the 4×4 IDCT output of the down sampler 56. In this way, the prediction from the reference picture memory 60 is up sampled to match the full resolution residual pixel structure, allowing the use of full resolution motion vectors. Then, the full resolution reference picture is down sampled prior to addition by the adder 58 in order to match the resolution of the down sampled residual from the down sampler 56.

There are several known good prediction up sampling/down sampling methods that tend to minimize the prediction error caused by up sampling reference pictures that have been down sampled with a 4×4 IDCT. These methods typically involve the use of a two dimensional filter having five to eight taps and tap values that vary both with the value of the motion vector for the predicted macroblock relative to the nearest macroblock boundaries in the reference picture, and with the position of the current pixel being interpolated within the predicted macroblock. Such a filter not only up samples the reduced resolution reference to full resolution and subsequently down samples in a single operation, but it can also include ½ pixel interpolation (when required due to an odd valued motion vector). (See, for example, "Minimal Error Drift in Frequency Scalability for Motion Compensated DCT Coding," Mokry and Anastassiou, *IEEE Transactions on Circuits and Systems for Video Technology*, August 1994, and "Drift Minimization in Frequency Scaleable Coders Using Block Based Filtering," Johnson and Princen, *IEEE Workshop on Visual Signal Processing and Communication*, Melbourne, Australia, September 1993.)

A more general derivation of minimum drift prediction filters by using the Moore-Penrose inverse of a block based down sampling filter is described in "Minimum Drift Architectures for 3-Layer Scalable DTV Decoding," Vetro, Sun, DaGraca and Poon, *IEEE Transactions on Consumer Electronics*, August 1998. For methods of down sampling other than by the use of the four point IDCT, the Vetro paper describes how to determine the optimum tap values for the up sampling filter. This up sampling can also be combined with the linear interpolation and down sampling operations to form a single prediction filter.

The down convertor 50, while generally adequate for progressive pictures with frame DCT coded blocks, does not address problems that arise when attempting to down convert sequences of interlaced pictures with mixed frame and field DCT coded blocks. These problems arise with respect to vertical down sampling and vertical prediction filtering.

Also, vertical down sampling for field pictures is performed on incoming field coded blocks and for frame pictures is performed on a mix of field and frame coded blocks. In the case of a mix of field and frame down sampled blocks, a given required prediction may overlap both types of blocks. This complication may be resolved by converting all incoming blocks to either frames or fields before down sampling. This conversion will result in a consistent vertical structure for reference pictures so that the same prediction filter can always be used.

For example, it has been suggested that all incoming pictures be converted to frames before performing vertical down sampling (see "Frequency Domain Down Conversion of HDTV Using Adaptive Motion Compensation," by Vetro, Sun, Bao and Poon, ICIP '97). Conversion to frames before performing vertical down sampling will result in better vertical resolution than would field based down sampling. However, frame based down sampling requires additional memory in the decoder because a first field must be stored when received in order to allow the second field to arrive so that frame blocks may be formed. Also, severe 20 blocking artifacts in motion sequences may occur (see "Frequency Domain Down Conversion of HDTV Using an Optimal Motion Compensation Scheme," by Vetro and Sun, *Journal of Imaging Science and Technology*, August 1998).

As suggested in the latter paper, conversion of all incoming pictures to fields before performing vertical down sampling avoids these problems. However, field macroblock processing generally produces a softer picture.

A third process vertically downsamples some macroblocks as fields and some as frames. The vertical downsampling of each macroblock is determined by the manner in which the corresponding macroblock was encoded. In other words, each macroblock is vertically downsampled as a frame if the encoder decided that macroblock was a frame, and each macroblock is vertically downsampled as a field if the encoder decided that macroblock was a field.

It may seem that this criterion of vertically downsampling each macroblock according to the manner in which it was encoded is correct. However, the encoder makes it decisions expecting a full resolution decoder. It has been observed that the encoder sometimes decides to encode a macroblock as a frame even though the macroblock contains field content. The downsampling decoders described above create visible artifacts when processing such macroblocks.

The present invention is directed to a decoder which decides whether each macroblock should be frame or field processed based upon which will produce the least artifacts. Errors are computed based upon several filters that can be used in the down conversion processing, with the filter producing the least error being selected to do the actual processing. These errors, for example, may be sum-squared-errors (SSE's).

SUMMARY OF THE INVENTION

In accordance with one aspect of the present invention, a method of downsampling a received picture to a lower resolution comprises a) horizontally downsampling the received picture, b) calculating at least first and second errors, wherein the first error is calculated based upon the received picture and a downsampled/upsampled version of the received picture derived from a first vertical downsampling filter, and wherein the second error is calculated based upon the received picture and a downsampled/upsampled version of the received picture derived from a second vertical downsampling filter; c) vertically downsampling the received picture using the first vertical downsampling filter if the first error is less than the second error; and, d) vertically downsampling the received picture using the second vertical downsampling filter if the second error is less than the first error.

In accordance with another aspect of the present invention, a downsampling apparatus downsamples a picture being processed and comprises an error calculation module and a filtering module. The error calculation module calculates first and second errors, where the first error is calculated based upon a difference between the picture being processed and a first version of the picture being processed derived from a first downsampling filter, and where the second error is calculated based upon a difference between the picture being processed and a second version of the picture being processed derived from a second downsampling filter. The filtering module downsamples the picture being processed using the first downsampling filter if the first error is less than the second error, and downsamples the picture being processed using the second downsampling filter if the second error is less than the first error.

In accordance with still another aspect of the present invention, a downsampling apparatus converts a received DCT coefficient macroblock to a reconstructed pixel block and comprises an IDCT module, a horizontal downsampler, a calculation module, a filtering module, and a motion compensator. The IDCT module performs an inverse DCT on the received DCT coefficient macroblock to produce a first intermediate block. The horizontal downsampler horizontally downsamples the first intermediate block to produce a second intermediate block. The calculation module calculates first and second errors. The first error is calculated based upon a difference between one of the first and second intermediate blocks and a first downsampled/upsampled version of the one of the first and second intermediate blocks derived from a first vertical downsampling filter, and the second error is calculated based upon a difference between the one of the first and second intermediate blocks and a second downsampled/upsampled version of the one of the first and second intermediate blocks derived from a second vertical downsampling filter. The filtering module vertically downsamples the second intermediate block using the first vertical downsampling filter if the first error is less than the second error, and vertically downsamples the second intermediate block using the second vertical downsampling filter if the second error is less than the first error. The motion compensator adds prediction reference pixels to the horizontally and vertically downsampled block, as appropriate, to form reconstructed pixels.

BRIEF DESCRIPTION OF THE DRAWINGS

These and other features and advantages of the present invention will become more apparent from a detailed consideration of the invention when taken in conjunction with the drawings in which:

FIG. 4 is a block diagram of a down converting decoder according to a first embodiment of the present invention;

FIGS. 5A, 5B, and 5C illustrate the division of a macroblock into four microblocks and sixteen nanoblocks;

FIGS. 17A and 17B shown an exemplary pixel grid alignment in connection with the first embodiment of the present invention.

DETAILED DESCRIPTION

I.—Down Conversion

A down converting decoder 100 according to a first embodiment of the present invention is shown in FIG. 4. For horizontal processing, the down converting decoder 100 implements (i) a horizontal four point inverse discrete cosine transform (IDCT) for filtering and down sampling, and (ii) complimentary horizontal minimum drift prediction filtering. For vertical processing, the down converting decoder 100 selects one of several filters for filtering and down sampling, and also implements complimentary vertical minimum drift prediction filtering. The selected down sampling filter has a size based upon the contents of the macroblock being processed at the time.

Figure 1:
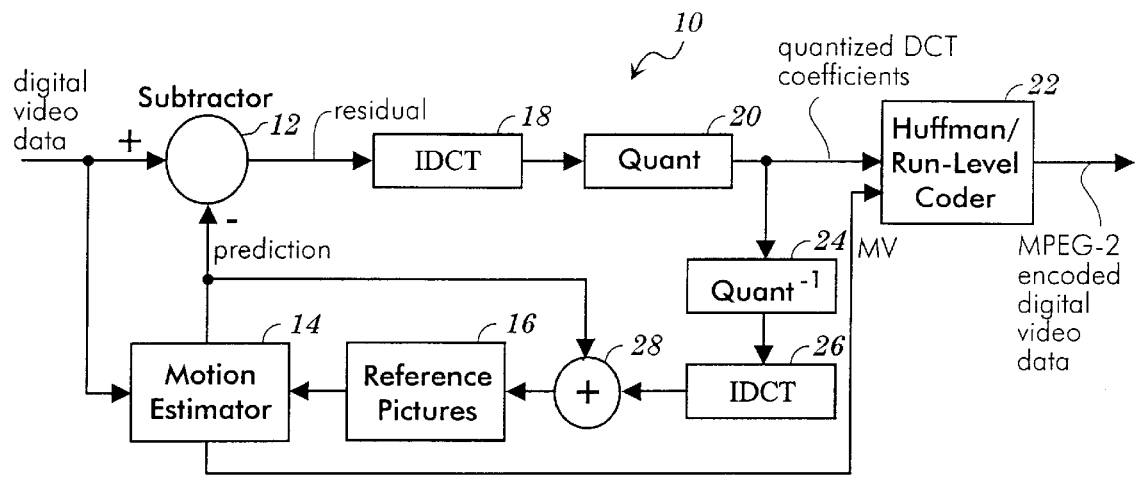
FIG. 1 is a simplified block diagram of a known MPEG-2 encoder.
Figure 2:
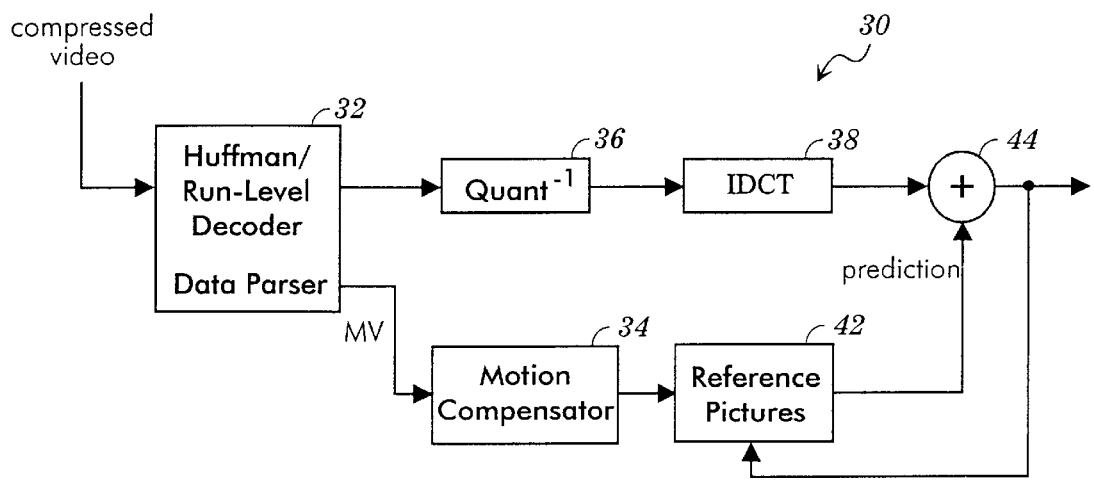
FIG. 2 is a simplified block diagram of a known MPEG-2 decoder.
Figure 3:
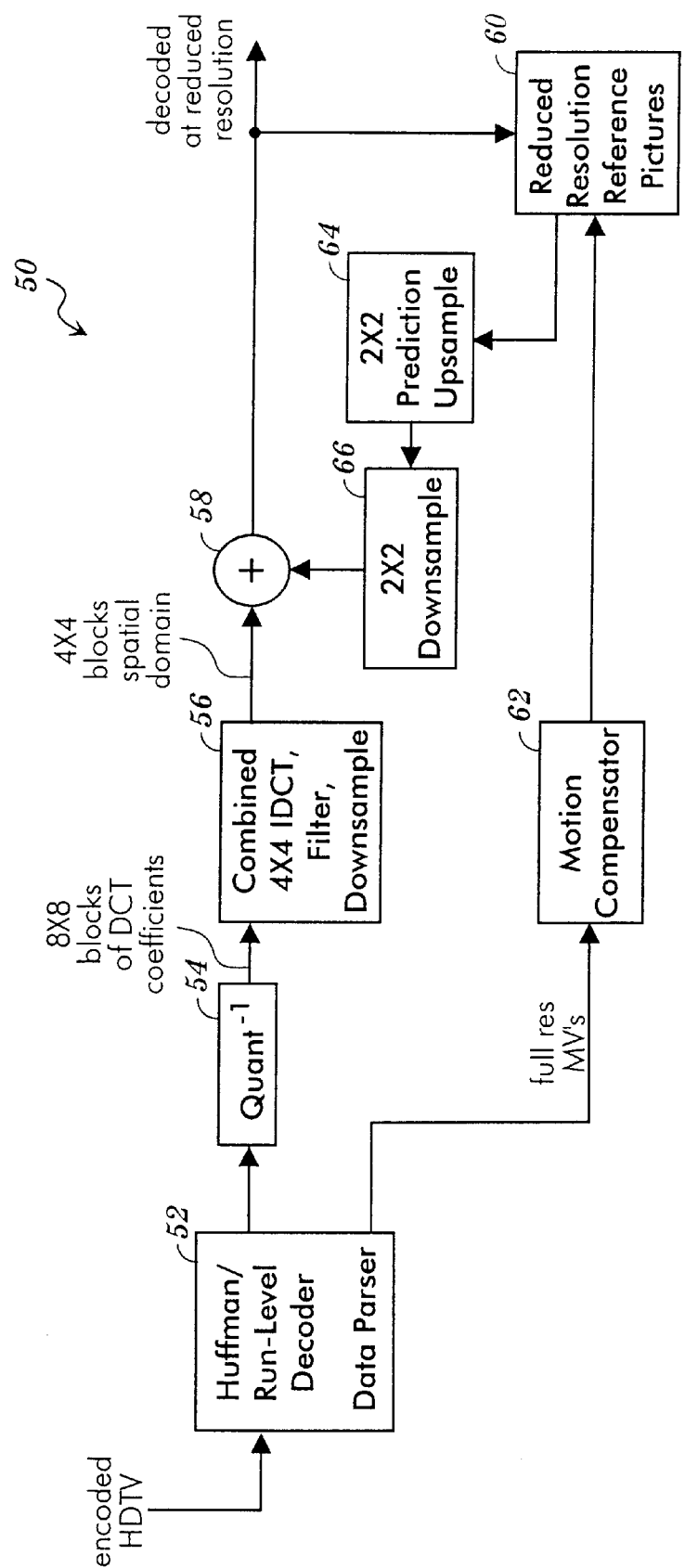
FIG. 3 is a block diagram of a known down conversion decoder for an HDTV application.

Accordingly, the down converting decoder 100 includes an IDCT module 102 which performs an eight point IDCT in exactly the same way as does the IDCT module 38 of the full memory MPEG decoder 30 illustrated in FIG. 2. Thus, the eight point IDCT applied by the IDCT module 102 is operated both horizontally and vertically on each 8×8 block of a macroblock.

Downsampling in both the horizontal and vertical directions is implemented by a filter select and downsampling module 104 and operates on a macroblock by macroblock basis. A full resolution macroblock is composed of 16×16 pixels. A macroblock contains four microblocks such that each full resolution microblock is composed of 8×8 pixels. Each microblock contains four nanoblocks. A full resolution nanoblock is composed of 4×4 pixels. Hence, a macroblock contains sixteen nanoblocks. A macroblock is shown in FIG. 5A, and the division of this macroblock into four microblocks and sixteen nanoblocks is shown in FIGS. 5B and 5C.

Let it be assumed that one macroblock is defined as [X], that the four microblocks of the macroblock [X] are defined as $[X_1]$–$[X_4]$, and that the sixteen nanoblocks of the macroblock [X] are defined as $[X_5]$–$[X_{21}]$. A matrix [HT4] can be defined as a four point truncated IDCT in accordance with the following equation.

$$[HT4] = [IDCT_4] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix} [DCT_8] \quad (1)$$

The matrix $[IDCT_M]$ is defined as an M point IDCT, and the matrix $[DCT_N]$ is defined as an N point DCT, with M being four and N being eight in the specific case of equation (1).

Horizontally, the transpose of [HT4] operates on each microblock $[X_i]$ to yield an 8×4 block $[Y_i]$ for i=1, 2, 3, 4. The new horizontally downsampled macroblock may be defined as [Y] and is obtained in accordance with the following equations:

$$[Y_i]_{8\times4} = [X_i]_{8\times8}[HT4^T]_{8\times4} \text{ for } i=1,2,3,4 \quad (2)$$

$$([Y])_{16\times8} = \begin{bmatrix} Y_1 & Y_2 \\ Y_3 & Y_4 \end{bmatrix} \quad (3)$$

Vertically, it does not matter whether a macroblock was frame or field encoded by the encoder. Instead, a new decision in accordance with the present invention is made based upon the content of the macroblock. This decision is based upon a calculation of several errors, such as sum-squared-errors. Specifically, in the specific case where sum-squared-errors are computed as the errors, then the following three sum-squared-errors (SSE's) are calculated: a macroblock frame SSE; a macroblock field SSE; and, a macroblock mixed SSE. Also, the following three microblock sum-squared-errors are calculated: a microblock frame SSE; a microblock field SSE; and, a microblock mixed SSE. Moreover, the following three nanoblock sum-squared-errors are calculated: a nanoblock frame SSE; a nanoblock frame-ave SSE; and, a nanoblock field SSE. Finally, a block size and filter are selected on the basis of which will produce the smallest sum-squared-error for a particular macroblock.

Macroblock processing operates on a 16×16 block. There are two different ways to process each macroblock, frame processing or field processing. Apart from the downsampling-upsampling filters, both processing types are similar. If the picture is an I frame, the macroblock [X] is stored as a reference macroblock. Otherwise, the 8×8 block from which the prediction occurs is upsampled and used as the reference macroblock. The full resolution macroblock is then downsampled using the downsampling filter [d0] which performs a discrete cosine transform (dct) truncation for frame or field content macroblocks. The downsampling filters [d0] for frame and field filtering are given by the following equations:

$$[d0]_{macroblock-frame} = \quad (4)$$

$$[IDCT_8] \begin{bmatrix} 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \end{bmatrix} [DCT_{16}]$$

$$[d0]_{macroblock-field} = [A] \begin{bmatrix} [IDCT_4] \\ [IDCT_4] \end{bmatrix} [B] \begin{bmatrix} [DCT_8] \\ [DCT_8] \end{bmatrix} [C] \quad (5)$$

where $$[A] = \begin{bmatrix} 1 & 0 & 0 & 0 & 0 & 0 & 0 & 0 \\ 0 & 0 & 0 & 0 & 1 & 0 & 0 & 0 \\ 0 & 1 & 0 & 0 & 0 & 0 & 0 & 0 \\ 0 & 0 & 0 & 0 & 0 & 1 & 0 & 0 \\ 0 & 0 & 1 & 0 & 0 & 0 & 0 & 0 \\ 0 & 0 & 0 & 0 & 0 & 0 & 1 & 0 \\ 0 & 0 & 0 & 1 & 0 & 0 & 0 & 0 \\ 0 & 0 & 0 & 0 & 0 & 0 & 0 & 1 \end{bmatrix}$$

$$[B] = \begin{bmatrix} 1 & 0 & 0 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \end{bmatrix}$$

$$[C] = \begin{bmatrix} 1 & 0 & 0 & 0 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 & 0 & 0 \\ 0 & 0 & 0 & 0 & 0 & 0 & 0 & 0 & 1 & 0 & 0 & 0 & 0 & 0 & 0 & 0 \\ 0 & 0 & 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 0 & 0 & 0 & 1 & 0 \\ 0 & 1 & 0 & 0 & 0 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 & 0 & 0 \\ 0 & 0 & 0 & 0 & 0 & 0 & 0 & 1 & 0 & 0 & 0 & 0 & 0 & 0 & 0 & 0 \\ 0 & 0 & 0 & 0 & 0 & 0 & 0 & 0 & 0 & 1 & 0 & 0 & 0 & 0 & 0 & 0 \\ 0 & 0 & 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 0 & 0 & 0 & 1 \end{bmatrix}$$

Vertically, [d0] operates on each 16×8 horizontally downsampled macroblock [Y]. This operation yields an 8×8 horizontally and vertically downsampled macroblock [Z] as shown by the following equation:

$$[Z]_{8\times 8} = [d0]_{8\times 16}[Y]_{16\times 8} \quad (6)$$

The downsampled macroblock [Z] is then upsampled using an upsampling filter [u0] which is the Moore-Penrose inverse of the downsampling matrix [d0] and which is given by the following equation:

$$[u0]_{n\times m} = [d0_{m\times n}]^T * ([d0_{m\times n}]^T * [d0_{m\times n}])^{-1} \quad (7)$$

Next, a macroblock frame error is determined based upon the difference between the original macroblock and a macroblock resulting from downsampling and upsampling of the original macroblock using the downsampling filter of equation (4) and an upsampling filter [u0] determined as the Moore-Penrose of the filter of equation (4). Similarly, a macroblock field error is determined based upon the difference between the original macroblock and a macroblock resulting from downsampling and upsampling of the original macroblock using the downsampling filter of equation (5) and an upsampling filter [u0] determined as the Moore-Penrose of the filter of equation (5). For example, these errors may be sum squared errors formed by squaring the difference between the value of each original full resolution pixel, orig_mab ([X]), and its corresponding downsampled-upsampled pixel, pred_mab and by summing the resulting 128 (16×8) squared errors to give the macroblock frame SSE ([d0]$_{macroblock\_frame}$ used) or the macroblock field SSE ([d0]$_{macroblock\_field}$ used). These calculations are shown by the following equations:

$$\text{macroblock-frame/field-}SSE = \quad (8)$$

$$\sum_{y=0}^{15} \sum_{x=0}^{7} [orig\text{-}mab(x, y) - pred\text{-}mab(x, y)]^2$$

$$pred\_mab(x,y) = u0 * d0 * orig\_mab(x,y) \quad (9)$$

where [d0] is given by equation (4) and equation (5), as appropriate, and where [u0] is the Moore-Penrose inverse of the appropriate [d0].

Some macroblocks, however, may be a mix of frame and field DCT coded microblocks and require the determination of a macroblock mixed SSE. In order to understand how to obtain a macroblock mixed SSE, an explanation of microblock processing is given here. Microblocks are processed in one of two ways: frame or field. Apart from the downsampling-upsampling filters, both processed are very similar. If the picture is an I frame, the [$X_i$], where i=1,2,3,4, is stored as a reference block. Otherwise, the 4×4 block from which the prediction occurs is upsampled and is used as the reference microblock. Each full resolution microblock is then downsampled using the downsampling filter [d1] which performs frame or field dct truncation and which is given by the following equations:

$$[d1]_{microblock-frame} = \begin{bmatrix} IDCT_4 \end{bmatrix} \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \end{bmatrix} [DCT_8] \quad (10)$$

$$[d1]_{microblock-field} = [A] \begin{bmatrix} [IDCT_2] \\ [IDCT_2] \end{bmatrix} [B] \begin{bmatrix} [DCT_4] \\ [DCT_4] \end{bmatrix} [C] \quad (11)$$

where $$[A] = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

$$[B] = \begin{bmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \end{bmatrix}$$

$$[C] = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix}$$

Vertically, [d1] operates on each 8×4 horizontally downsampled macroblock $[Y_i]$ yielding a 4×4 horizontally and vertically downsampled microblock $[Z_i]$ for i=1,2,3,4. This operation is shown by the following equation:

$$[Z_i]_{4 \times 4} = [d1]_{4 \times 8} [Y_i]_{8 \times 4} \text{ for } i=1,2,3,4 \quad (12)$$

The downsampled microblock is then upsampled using [u1], which is the Moore-Penrose inverse of [d1].

Next, a microblock frame error is determined based upon the difference between the original microblock and a microblock resulting from downsampling and upsampling of the original microblock using the downsampling filter of equation (10) and an upsampling filter [u1] determined as the Moore-Penrose of the filter of equation (10). Similarly, a microblock field error is determined based upon the difference between the original microblock and a microblock resulting from downsampling and upsampling of the original microblock using the downsampling filter of equation (11) and an upsampling filter [u1] determined as the Moore-Penrose of the filter of equation (11). For example, these errors may be sum squared errors formed by squaring the difference between the value of each original full resolution pixel, orig_mib, and its corresponding downsampled-upsampled pixel, pred_mib. The thirty-two (8×4) square errors are summed to give the microblock frame SSE ($[d1]_{microblock-frame}$ used) or the microblock field SSE ($[d1]_{microblock-field}$ used). These operations are shown by the following equations:

$$\text{microblock-frame/field-}SSE = \sum_{y=0}^{7} \sum_{x=0}^{3} [\text{orig-mib}(x,y) - \text{pred-mib}(x,y)]^2 \quad (13)$$

$$\text{pred\_mib}(x,y) = u1 * d1 * \text{orig\_mib}(x,y) \quad (14)$$

where [d1] is given by equation (10) or equation (11) depending upon whether the microblock error is frame microblock error or a field microblock error, and where [u1] is the Moore-Penrose inverse of the appropriate [d1].

Some microblocks, however, may be a frame and field mix and require the determination of a microblock mixed SSE. In order to understand how to obtain a microblock mixed SSE, an explanation of nanoblock processing is given here. Nanoblocks are processed in one of three ways: frame, frame-ave, or field. Apart from the downsampling-upsampling filters, all three processes are similar. If the picture is an I frame, the $[X_i]$, where i=5,6, . . . 21, is stored as a reference nanoblock. Otherwise, the 2×2 block from which the prediction occurs is upsampled and used as the reference nanoblock. Each full resolution nanoblock is then downsampled using the downsampling filter [d2] which performs frame, frame averaging, or field dct truncation as shown by following equations:

$$[d2]_{nanoblock-frame} = [IDCT_2]\begin{bmatrix} 1 & 0 & 0 & 0 \\ 0 & 1 & 0 & 0 \end{bmatrix}[DCT_4] \quad (15)$$

$$[d2]_{nanoblock-frameave} = \begin{bmatrix} 0.5 & 0.5 & 0 & 0 \\ 0 & 0 & 0.5 & 0.5 \end{bmatrix} \quad (16)$$

$$[d2]_{nanoblock-field} = \begin{bmatrix} 0.5 & 0 & 0.5 & 0 \\ 0 & 0.5 & 0 & 0.5 \end{bmatrix} \quad (17)$$

Vertically, [d2] operates on each 4×2 horizontally downsampled macroblock $[Y_i]$ yielding a 2×2 horizontally and vertically downsampled microblock $[Z_i]$ for i=5,6, . . . 21. This operation is shown by the following equation:

$$[Z_i]_{2 \times 2} = [d2]_{2 \times 4} [Y_i]_{4 \times 2} \text{ for } i=5,6, \ldots 21 \quad (18)$$

The downsampled nanoblock is then upsampled using [u2], which is the Moore-Penrose inverse of the appropriate [d2].

Next, a nanoblock frame error is determined based upon the difference between the original nanoblock and a nanoblock resulting from downsampling and upsampling of the original nanoblock using the downsampling filter of equation (15) and an upsampling filter [u2] determined as the Moore-Penrose of the filter of equation (15). Similarly, a nanoblock frameave error is determined based upon the difference between the original nanoblock and a nanoblock resulting from downsampling and upsampling of the original nanoblock using the downsampling filter of equation (16) and an upsampling filter [u2] determined as the Moore-Penrose of the filter of equation (16). Also, a nanoblock field error is determined based upon the difference between the original nanoblock and a nanoblock resulting from downsampling and upsampling of the original nanoblock using the downsampling filter of equation (17) and an upsampling filter [u2] determined as the Moore-Penrose of the filter of equation (17).

For example, these errors may be sum squared errors formed by squaring the difference between the value of each original full resolution pixel, orig_nb, and its corresponding downsampled-upsampled pixel, pred_nb. The resulting eight (4×2) square errors are summed to give the nanoblock frame SSE ($[d2]_{nanoblock-frame}$ used) or nanoblock frame-ave SSE ($[d2]_{nanoblock-frameave}$ used) or the nanoblock field SSE ($[d2]_{nanoblock-field}$ used). These operations are shown by the following equations:

$$\text{nanoblock-frame/frameave/field-}SSE = \sum_{y=0}^{3} \sum_{x=0}^{1} [\text{orig-nb}(x,y) - \text{pred-nb}(x,y)]^2 \quad (19)$$

$$\text{pred\_nb}(x,y) = u2 * d2 * \text{orig\_nb}(x,y) \quad (20)$$

where [d2] is given by equation (15), equation (16), or equation (17) depending upon whether a nanoblock frame error, a nanoblock frameave error, or a nanoblock field error is being calculated, and where [u2] is the Moore-Penrose inverse of the appropriate [d2].

Thus, a macroblock frame SSE and a macroblock field SSE can be determined from equations (8) and (9) upon proper selection of [d0]. A macroblock mixed SSE requires the summing of four microblock SSE's—each of which is the smallest microblock SSE (a microblock frame SSE, a microblock field SSE, or a microblock mixed SSE). The microblock frame SSE and the microblock field SSE can be determined from equations (13) and (14) upon proper selection of [d1]. A microblock mixed SSE is determined as the sum of four nanoblock SSE's—each of which is the smallest nanoblock SSE (a nanoblock frame SSE, a nanoblock frame-ave SSE, or a nanoblock field SSE).

Figure 6:
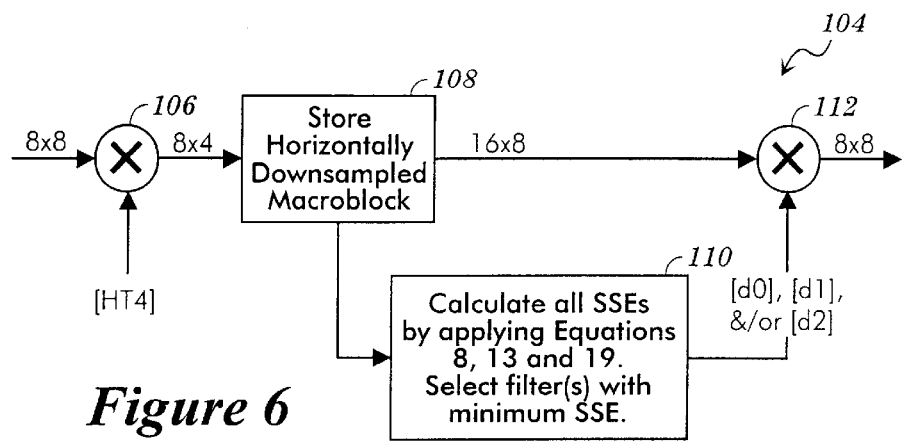
FIG. 6 shows the filter select and downsampling module of FIG. 4 in more detail.

The filter select and downsampling module 104, which is shown in more detail in FIG. 6, utilizes the horizontal filter [HT4] described above and given in equation (1). The filter select and downsampling module 104 also utilizes the vertical filters [d0], [d1], and [d2]. Thus, for every macroblock, a multiplier 106 multiplies each of its four 8×8 microblocks by [HT4], which is the four-point truncated IDCT. The resulting four 8×4 horizontally downsampled macroblocks are stored by a memory module 108 as a 16×8 horizontally downsampled macroblock.

An SSE calculation module 110 then calculates the macroblock frame SSE, the macroblock field SSE, and the macroblock mixed SSE in accordance with equations (8), (13), and (19) as described above. The filters [d0], [d1], and [d2] which result in the smallest SSE are selected by the SSE calculation module 110 for application to the 16×8 horizontally downsampled macroblocks stored in the memory module 108. Accordingly, a multiplier 112 multiplies each 16×8 horizontally downsampled macroblock from the memory module 108 by the appropriate vertical downsampling filter(s) [d0], [d1], and/or [d2].

More specifically, the SSE calculation module 110 calculates a macroblock frame SSE and a macroblock field SSE according to equation (8) for a macroblock being processed. The SSE calculation module 110 saves the smaller of the calculated macroblock frame SSE and macroblock field SSE. The SSE calculation module 110 then calculates the microblock frame SSE and the microblock field SSE for the first microblock of the macroblock currently being processed and saves the smaller of the two. The SSE calculation module 110 repeats this procedure for the other three microblocks of the macroblock currently being processed, sums the resulting four microblock SSES, compares this sum of the four microblock SSEs to the previously saved macroblock SSE, and saves the smaller of the sum of the four microblock SSEs and the previously saved macroblock SSE.

Next, the SSE calculation module 110 calculates the nanoblock frame SSE, nanoblock frameave SSE, and the nanoblock field SSE for the first nanoblock of the macroblock currently being processed and saves the smallest of the three. The SSE calculation module 110 repeats this procedure for the other fifteen nanoblocks of the macroblock currently being processed. If a macroblock SSE had been previously saved over microblock SSES, then a nanoblock SSE sum is computed from the resulting sixteen nanoblock SSEs, the resulting nanoblock SSE sum is compared to the previously saved macroblock SSE, and the smaller of the previously saved macroblock SSE and the nanoblock SSE sum is saved.

On the other hand, if microblock SSEs were previously saved over a macroblock SSE, then a first nanoblock SSE sum is computed from the four nanoblock SSEs saved in relation to the first microblock, the resulting first nanoblock SSE sum is compared to the microblock SSE saved in relation to the first microblock, and the smaller of the first nanoblock SSE sum and the microblock SSE previously saved in relation to the first microblock is saved. This process is repeated for the remaining three microblocks.

The SSE calculation module 110 supplies the downsampling filter(s) which result in the minimum SSE to the multiplier 112. For example, if the smallest SSE is the macroblock_frame SSE, then one downsampling filter (given by equation (4)) is supplied to the multiplier 112; whereas, if the smallest SSE is the macroblock_field SSE, then one downsampling filter (given by equation (5)) is supplied to the multiplier 112. On the other hand, if the smallest SSE is the macroblock_mixed SSE resulting from summing the microblock_frame SSE for the first microblock of a macroblock, the microblock_field SSE for the second microblock of the macroblock, the microblock_field SSE for the third microblock of the macroblock, and the microblock_frame SSE for the fourth microblock of the macroblock, then four downsampling filters (given by equations (10), (11), (11), and (10)) are supplied to the multiplier 112.

As still another example, if the smallest SSE is the microblock_mixed SSE resulting from using the microblock_frame SSE for the first microblock of a macroblock, the microblock_field SSE for the second microblock of the macroblock, the microblock_field SSE for the third microblock of the macroblock, and the four nanoblock SSEs nanoblock_frame SSE, nanoblock_frameave SSE, nanoblock_field SSE, and nanoblock_frame SSE for the fourth microblock of the macroblock, then seven downsampling filters (given by equations (10), (11), (11), (15), (16), (17), and (15)) are supplied to the multiplier 112.

When vertically downsampling each macroblock, a map is created by a map module 114 of FIG. 4. This map describes the corresponding downsampling filter that was selected by the filter select and downsampling module 104 for that macroblock. Later, when upsampling occurs during motion compensation, the map is referenced in order to select the correct upsampling filter. The map is also referenced for grid alignment as described below.

The processing described above requires three maps. These three maps correspond to the three frames (current frame, forward reference frame, and backward reference frame) of a full memory MPEG decoder. The pointers to the maps are switched at the same time the pointers to the frames are switched. Hence, the maps operate in a similar way to the frames.

For 1920×1088 I pictures, a 480×272 map is created. Each map pixel represents a 4×4 nanoblock of the picture and has a value corresponding to a filter type. Currently, there are seven different possible vertical filters as described above ($[d0]_{macroblock\_frame}$, $[d0]_{macroblock\_field}$, $[d1]_{microblock\_frame}$, $[d1]_{microblock\_field}$, $[d2]_{nanoblock\_frame}$, $[d2]_{nanoblock\_frameave}$, and $[d2]_{nanoblock\_field}$). Seven filters require the use of three bits per map pixel resulting in a 2.5% increase in memory. Accordingly, the decoder of the present invention is a 27.5% memory decoder.

The vertical upsampling matrix [u] is based upon the Moore-Penrose inverse of the downsampling matrix [d]. This relationship is generally described by the following equation:

$$[u]_{n \times m} = [d_{m \times n}]^T * ([d_{m \times n}]^T * [d_{m \times n}])^{-1} \quad (21)$$

Figure 7:
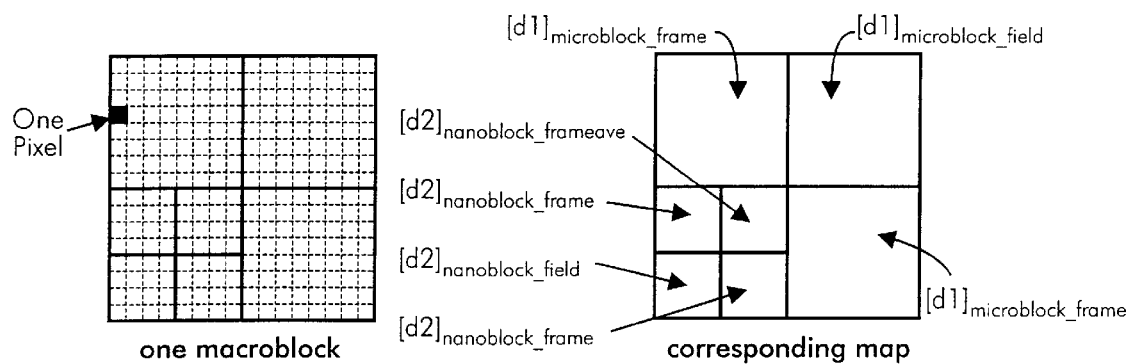
FIG. 7 shows a filter map for an exemplary macroblock.

Horizontally, the Moore-Penrose inverse of $[HT4^T]_{8 \times 4}$ from Equation (2) is $[HT4]_{4 \times 8}$. $[HT4]_{4 \times 8}$ is applied to upsample each downsampled block. Depending on which vertical downsampling filter is used to downsample a macroblock, that filter being stored in the map module 114, the macroblock is upsampled in a complementary way for motion compensation. This upsampling is based upon the Moore-Penrose inverse of the vertical downsampling filter [d] and is given by equation (21). For instance, for the macroblock shown in FIG. 7, it is assumed that the minimum SSE of this macroblock is given by the macroblock mixed SSE. Specifically, the upper left 8×8 block selects to $[d1]_{microblock\_frame}$ as the downsampling filter. The upper right 8×8 block selects $[d1]_{microblock\_field}$ as the downsampling filter. The lower left 8×8 block selects nanoblock processing according to the follow: the upper left 4×4 block selects $[d2]_{nanoblock\_frame}$ as the downsampling filter; the upper right 4×4 block selects $[d2]_{nanoblock\_framave}$ as the downsampling filter; the lower left 4×4 block selects $[d2]_{nanoblock\_field}$ as the downsampling filter; and, the lower right 4×4 block selects $[d2]_{microblock\_frame}$ as the downsampling filter. Finally, the lower right 8×8 block selects $[d1]_{microblock\_frame}$ as the downsampling filter.

Figure 8:
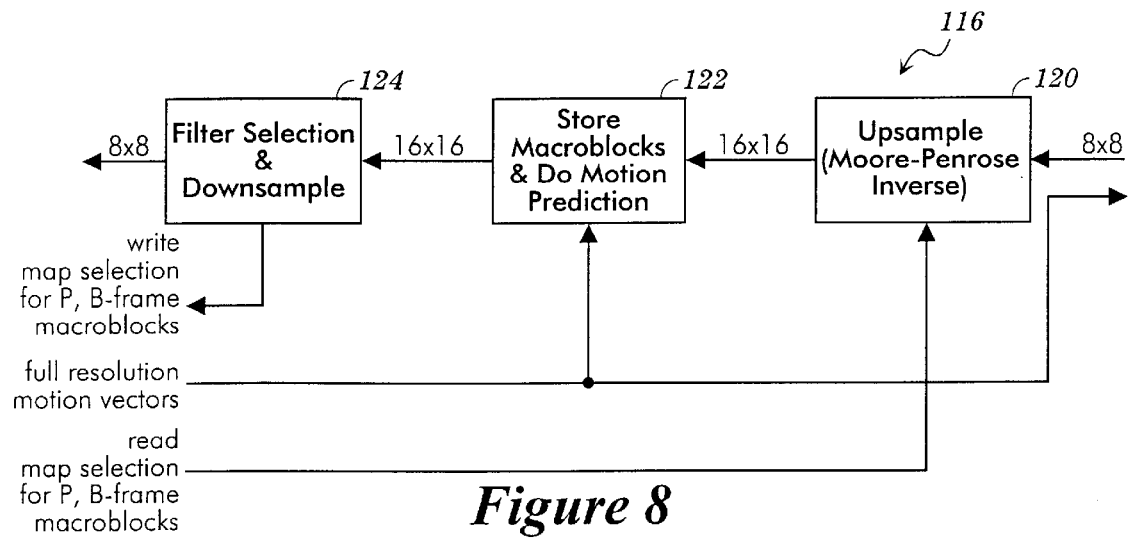
FIG. 8 shows the motion compensation module of the decoder illustrated in FIG. 4 in additional detail.

Hence, the map module 114 contains a map of these vertical downsampling filters for this macroblock and supplies these vertical downsampling filters to a motion compensation module 116 which is shown in more detail in FIG. 8. Using the full resolution motion vectors as addresses, 8×8 blocks are obtained from a reference frame memory 118 (FIG. 4). These blocks are then upsampled by an upsample module 120 using the Moore-Penrose inverses of the downsampling filters read from the map module 114 based upon an 8×8 downsampled macroblock currently exiting the filter select and downsampling module 104. Then, four to nine full resolution macroblocks are stored in a memory module 122 so that a full resolution motion vector prediction can be done using full resolution motion vectors just as in the case of a full memory MPEG decoder. Thus, the result is a 16×16 full resolution macroblock. Next, a filter selection and downsample module 124 of the motion compensation module 116 operates on the 16×16 full resolution macroblock using the filters that resulted in the Moore-Penrose inverses determined by the upsample module 120. The result is an 8×8 block that is supplied by the filter selection and downsample module 124 to an adder 126 of the down converting decoder 100. The adder 126 adds the 8×8 block supplied by the filter selection and downsample module 124 to the 8×8 block exiting the filter select and downsampling module 104. The resulting pixel values are supplied to the reference frame memory 118 for storage. The input to the adder 126 from the filter selection and downsample module 124 is forced to zero in the case where the 8×8 block from the filter select and downsampling module 104 is an I frame.

Before a picture can be displayed or post-filtered, the map needs to be referenced for proper grid alignment by a grid alignment module 128. Pixels that have been frame downsampled-upsampled need no grid alignment. However, pixels that have been field downsampled/upsampled do need grid alignment for proper display.

For downsampled/upsampled field pixels, there are four situations to consider. First, if the nanoblock above the pixel is field processed, then a ⅛, ⅞ shift must occur with the pixel two above. For example, as shown by the three columns in FIG. 17A, the four nanoblock field pixels a, b, a, b enclosed by the rectangle in the first column have been downsampled to the two pixels a' and b' shown in the second column. The resulting pixel a' is grid aligned by summing ⅞ of its value with ⅛ of the value of the pixel a' above it.

Second, if the nanoblock below the pixel is field processed, then a ⅞, ⅛ shift must occur with the pixel two below. For example, again as shown by the three columns in FIG. 17A, the four nanoblock field pixels a, b, a, b enclosed by the rectangle in the first column have been downsampled to the two pixels a' and b' shown in the second column. The resulting pixel b' is grid aligned by summing ⅞ of its value with ⅛ of the value of the pixel b' below Third, if the nanoblock above the pixel is frame processed, then a ⅑, ⅜ shift must occur with the pixel two above. For example, as shown by the three columns in FIG. 17B, the four nanoblock field pixels a, b, a, b enclosed by the rectangle in the first column have been downsampled to the two pixels a' and b' shown in the second column. The resulting pixel a' is grid aligned by summing ⅜ of its value with ⅑ of the value of the pixel a' above it.

Fourth, if the nanoblock below the pixel is frame processed, then a ⅜, ⅑ shift must occur with the pixel two below. For example, again as shown by the three columns in FIG. 17B, the four nanoblock field pixels a, b, a, b enclosed by the rectangle in the first column have been downsampled to the two pixels a' and b' shown in the second column. The resulting pixel b' is grid aligned by summing ⅜ of its value with ⅑ of the value of the pixel b' below it.

Figure 9:
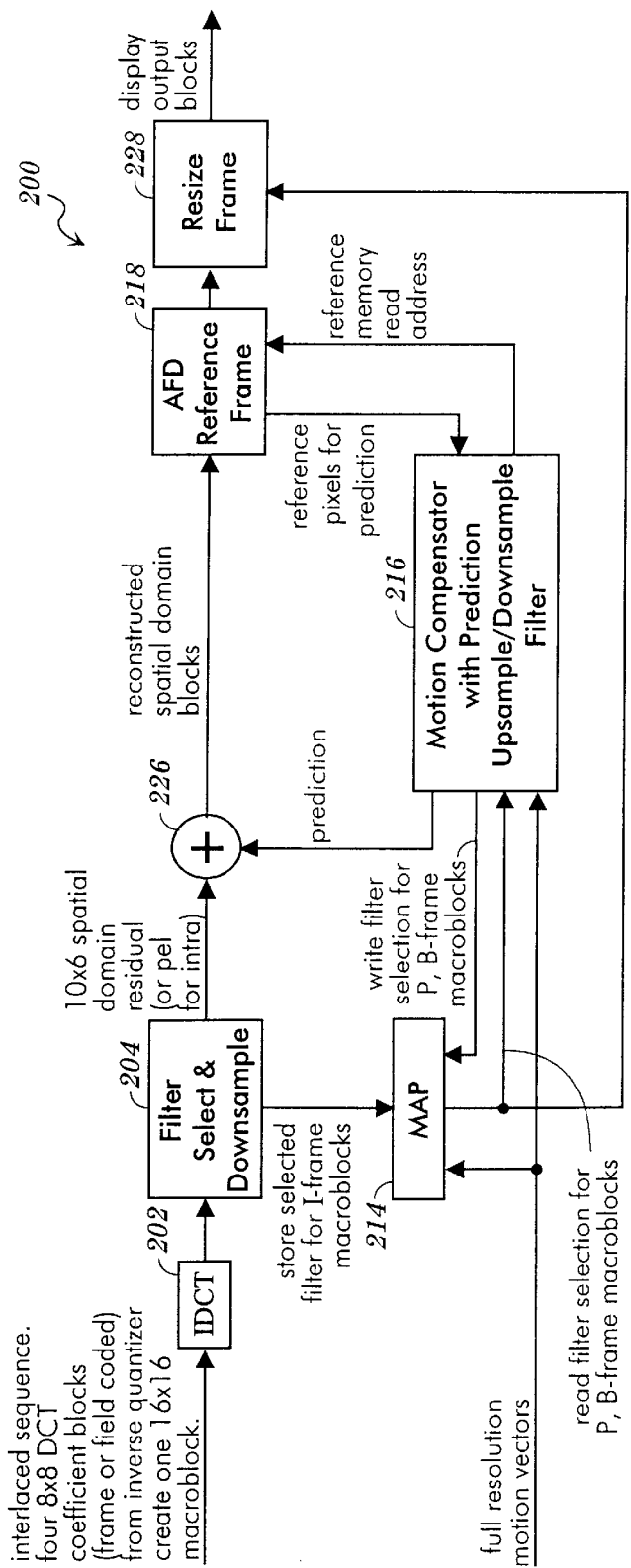
FIG. 9 is a block diagram of a down converting decoder according to a second embodiment of the present invention.

A down converting decoder 200 according to a second embodiment of the present invention is shown in FIG. 9. This second embodiment involves operations on microblocks only, using different horizontal and vertical filters and different memory usage. For horizontal processing, the down converting decoder 200 implements a horizontal three point inverse discrete cosine transform (IDCT) for filtering and down sampling, and complimentary horizontal minimum drift prediction filtering. For vertical processing, the down converting decoder 200 implements different filters, based upon the contents of the macroblock, and complimentary vertical minimum drift prediction filtering.

The decoder 200 includes an IDCT module 202 which performs an eight point IDCT in exactly the same way that the IDCT module 38 of the full memory MPEG decoder 30 illustrated in FIG. 2 performs its eight point IDCT. Thus, the eight point IDCT applied by the IDCT module 202 operates both horizontally and vertically on each 8×8 block of a macroblock.

Downsampling in both the horizontal and vertical directions is implemented by a filter select and downsampling module 204 which operates on a macroblock by macroblock basis. As discussed above, a full resolution macroblock is composed of 16×16 pixels, and a macroblock contains four microblocks. A full resolution microblock is composed of 8×8 pixels. The division of a macroblock into four microblocks is shown in FIGS. 5A and 5B.

If one macroblock is defined as [X] and if the four microblocks of the macroblock [X] are defined as $[X_1]$–$[X_4]$, then a matrix [HT3] may be defined as a three point truncated IDCT as shown by the following equation:

$$[HT3] = [IDCT_3]\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \end{bmatrix}[DCT_8] \quad (22)$$

The matrices $[IDCT_M]$ and $[DCT_N]$ are defined as an M point IDCT and an N point DCT, respectively. In the case of equation (22), M is three and N is eight.

Horizontally, the transpose of [HT3] operates on each microblock $[X_i]$ to yield an 8×3 block $[Y_i]$ for i=1, 2, 3, 4. A new horizontally downsampled macroblock may be defined as [Y]. This definition is shown more fully by the following equations:

$$[Y_i]_{8\times3}=[X_i]_{8\times8}[HT3^T]_{8\times3} \text{ for } i=1,2,3,4 \quad (23)$$

$$[Y]_{16 \times 6} = \begin{bmatrix} Y_1 & Y_2 \\ Y_3 & Y_4 \end{bmatrix} \quad (24)$$

Vertically, it does not matter whether a macroblock was frame or field encoded by the encoder. Again, a new decision in accordance with the present invention is made based upon the content of the macroblock. This decision is based upon a calculation of nine errors for each of the four microblocks. Thus, a total of thirty-six errors is calculated for each macroblock. The filter yielding the smallest SSE for each microblock is chosen for downsampling.

There are n different ways to process each microblock, where $n \geq 2$. For example, disclosed herein are nine downsampling-upsampling filters for use in the case where n=9. Apart from these downsampling-upsampling filters, all processes are similar. If the picture is an I frame, the microblock $[X_i]$, where i=1,2,3,4, is stored as a reference microblock. Otherwise, the 5×3 block from which the prediction occurs is vertically upsampled and used as the reference microblock. This vertical full resolution upsampled microblock is then vertically downsampled using the downsampling filter [d0] which is given by the following equation:

$$[d0] = [IDCT_5] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \end{bmatrix} [DCT_8] \quad (25)$$

Vertically, [d0] operates on each 8×3 horizontally downsampled microblock $[Y_i]$ of the macroblock [Y]. Each such operation yields a 5×3 horizontally and vertically downsampled microblock $[Z_i]$ for i=1,2,3,4 as shown by the following equations:

$$[Z]_{5 \times 3} = [d0]_{5 \times 8} [Y]_{8 \times 3} \text{ for } i=1,2,3,4 \quad (26)$$

$$[Z]_{10 \times 6} = \begin{bmatrix} Z_1 & Z_2 \\ Z_3 & Z_4 \end{bmatrix} \quad (27)$$

The downsampled macroblock [Z] is then horizontally and vertically upsampled using the Moore-Penrose inverse [u0] of the downsampling matrix [d0]. The upsampling filter [u0] is given by equation (7) above.

An error is determined based upon the difference between the original microblock and a microblock resulting from downsampling and upsampling of the original microblock using the downsampling filter of equation (25) and an upsampling filter determined as the Moore-Penrose of the filter of equation (25). For example, this error may be the sum squared error which is determined by squaring the difference between the value of each original full resolution pixel orig_mab, and its corresponding downsampled-upsampled pixel pred_mab, and by summing the resulting 24 (8×3) squared errors to give SSE0. These calculations are shown by the following equations:

$$SSE0 = \sum_{y=0}^{7} \sum_{x=0}^{2} [orig\text{-}mib(x,y) - pred\text{-}mib(x,y)]^2 \quad (28)$$

$$pred\text{-}mib(x,y) = u0 * d0 * orig\text{-}mib(x,y) \quad (29)$$

where [d0] is given by equation (25), and where [u0] is determined as the Moore-Penrose inverse of [d0].

Similarly, this process is repeated eight more times by replacing filters [d0] and [u0] in equations (28) and (29) with filters [d1] and [u1], [d2] and [u2], [d3] and [u3], [d4] and [u4], [d5] and [u5], [d6] and [u6], [d7] and [u7], and [d8] and [u8] to yield SSE1, SSE2, SSE3, SSE4, SSE5, SSE6, SSE7, and SSE8, respectively. The following equations define the filters [d1]–[d8]:

$$[d1] = [IDCT_5] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \end{bmatrix} [DCT_8] \quad (30)$$

$$[d2] = [IDCT_5] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 1 & 0 \end{bmatrix} [DCT_8] \quad (31)$$

$$[d3] = [IDCT_5] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & 0 & 0 & 0 & 1 \end{bmatrix} [DCT_8] \quad (32)$$

$$[d4] = [IDCT_5] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \end{bmatrix} [DCT_8] \quad (33)$$

$$[d5] = [IDCT_5] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 0 & 1 \end{bmatrix} [DCT_8] \quad (34)$$

$$[d6] = [IDCT_5] \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix} [DCT_8] \quad (35)$$

$$[d7] = [IDCT_5] \begin{bmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 0 & 1 \end{bmatrix} [DCT_8] \quad (36)$$

$$[d8] = [A] \begin{bmatrix} [IDCT_2] \\ [IDCT_2] \end{bmatrix} [B] \begin{bmatrix} [DCT_4] \\ [DCT_4] \end{bmatrix} [C] \quad (37)$$

where $$[A] = \begin{bmatrix} 1 & 0 & 0 & 0 \\ 0 & 0 & 1 & 0 \\ 0 & 1 & 0 & 0 \\ 0 & 0 & 0 & 1 \end{bmatrix}$$

$$[B] = \begin{bmatrix} 1 & 0 & 0 & 0 & 0 & 0 & 0 & 0 \\ 0 & 1 & 0 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \end{bmatrix}$$

$$[C] = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix}$$

Thus, the filter yielding the smallest SSE for each microblock is selected as the filter for downsampling that microblock and is saved in a Map module for later use in motion compensation, as described hereinafter.

Figure 10:
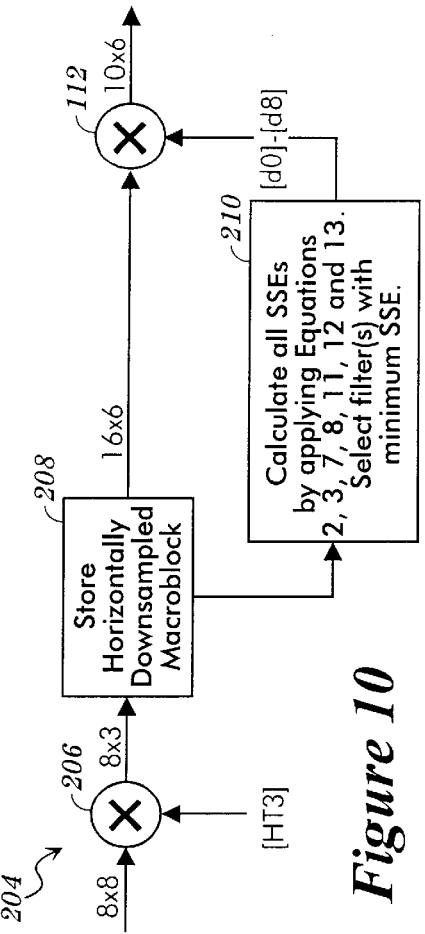
FIG. 10 shows the filter select and downsampling module of FIG. 9 in more detail.

The filter select and downsampling module 204, which is shown in more detail in FIG. 10, utilizes the horizontal filter [HT3] described above and given in equation (22). The filter select and downsampling module 204 also utilizes the vertical filters [d0]–[d8]. Thus, for each macroblock, a multiplier 206 multiplies each of its four 8×8 microblocks by [HT3] as given in equation (22). The four resulting horizontally downsampled 8×3 microblocks are stored in a memory 208 as a horizontally downsampled 16×6 macroblock. Also, an SSE calculation module 210 calculates SSE0 for each of the microblocks prior to the vertical downsampling imposed by a multiplier 212 by applying [d0] and [u0] according to equations (28) and (29). Similarly, the SSE calculation module 210 calculates SSE1–SSE8 for each microblock prior to vertical downsampling by applying [d1] and [u1] through [d8] and [u8], respectively. The filter corresponding to the lowest one of SSE0–SSE8 calculated for the first of the four microblocks is saved, the filter corresponding to the lowest one of SSE0–SSE8 calculated for the second of the four microblocks is saved, the filter corresponding to the lowest one of SSE0–SSE8 calculated for the third of the four microblocks is saved, and the filter corresponding to the lowest one of SSE0–SSE8 calculated for the fourth of the four microblocks is saved. The saved filters are used for the vertical downsampling of the corresponding microblocks. Thus, the multiplier 212 multiplies each of the horizontally downsampled 8×3 microblocks of the horizontally downsampled 16×6 macroblock from the memory 208 by the corresponding saved filter to produce both a horizontally and vertically downsampled macroblock.

When vertically downsampling each macroblock, a map is created by a map module 214 of FIG. 9. This map describes the four downsampling filters that were selected by the filter select and downsampling module 204 for vertically downsampling that macroblock. Later, when upsampling occurs, the map is referenced in order to select the correct upsampling filters.

The processing described above requires three maps. These three maps correspond to the three frames (current frame, forward reference frame, and backward reference frame) of a full memory MPEG decoder. The pointers to the maps are switched at the same time the pointers to the frames are switched. Hence, the maps operate in a similar way to the frames.

For 1920×1088 I pictures, a 240×136 map is created. Each map pixel represents an 8×8 microblock of the picture and has a value corresponding to a filter type. There are nine different possible vertical filters as described above, although a different number of filters could be used according to the present invention. Nine filters require the use of four bits per map pixel resulting in a 0.8% increase in memory. Accordingly, the decoder of this embodiment of the present invention is a 25.8% memory decoder.

Figure 11:
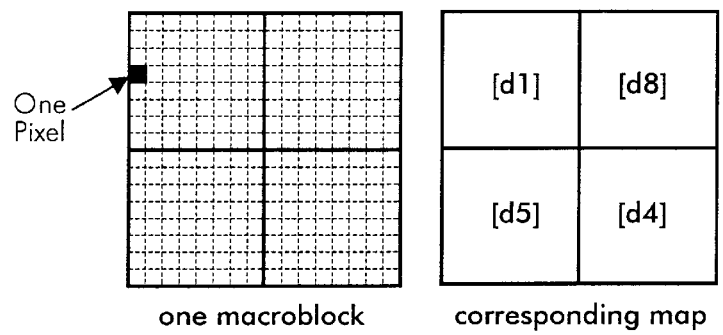
FIG. 11 shows a filter map for an exemplary macroblock.
Figure 12:
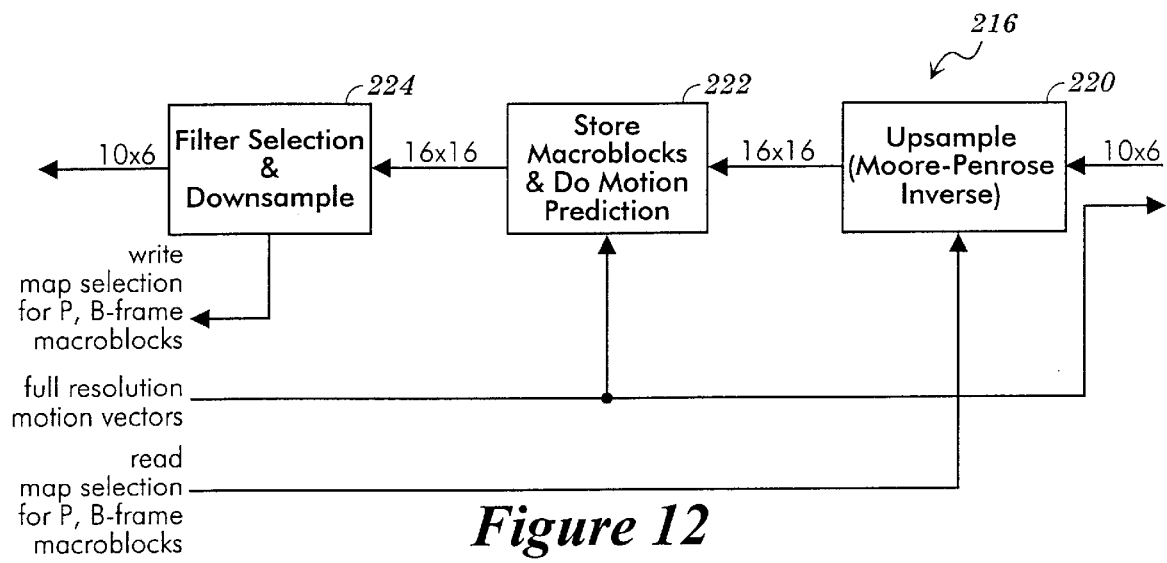
FIG. 12 shows the motion compensation module of the decoder illustrated in FIG. 9 in additional detail.

In general, the vertical upsampling matrix [u] is based upon the Moore-Penrose inverse of the downsampling matrix [d]. This relationship is described by equation (21). Horizontally, the Moore-Penrose inverse of $[HT3^T]_{8 \times 3}$ is $[HT3]_{3 \times 8}$ from Equation (22). During motion compensation, $[HT3]_{3 \times 8}$ is applied to horizontally upsample each downsampled block. Then, depending on how a macroblock was vertically downsampled, the macroblock is vertically upsampled in a complementary way based upon the Moore-Penrose inverse. For instance, for the macroblock shown in FIG. 11, the vertical downsampling filters [d1], [d8], [d5], and [d4] were selected for vertical downsampling based upon the lowest SSE of each microblock. That is, vertical downsampling filter [d1] was selected for the upper left microblock, vertical downsampling filter [d8] was selected for the upper right microblock, vertical downsampling filter [d5] was selected for the lower left microblock, and vertical downsampling filter [d4] was selected for the lower right microblock. Hence, the Map module 214 contains a map of these vertical downsampling filters and supplies these vertical downsampling filters to a motion compensation module 216 which is shown in more detail in FIG. 12.

Using the full resolution motion vectors as addresses, the motion compensation module 216 obtains 10×6 blocks from a reference frame memory 218 (FIG. 9). These blocks are then upsampled by an upsample module 220 using the Moore-Penrose inverses of the downsampling filter read from the map module 214. Then, four to nine full resolution macroblocks are stored in a memory module 222 so that a full resolution motion vector prediction can be done using a full resolution motion vector just as in the case of a full memory MPEG decoder. Thus, the result is a 16×16 full resolution macroblock. The full resolution motion vector selects a 16×16 full resolution macroblock from the memory module 222. Next, a filter selection and downsample module 224 of the motion compensation module 216 operates on the selected 16×16 full resolution macroblock according to the filter saved in the Map as described previously. The result is a 10×6 block that is supplied by the filter selection and downsample module 224 as a prediction to an adder 226 of the decoder 200. The adder 226 adds the 10×6 block supplied by the filter selection and downsample module 224 to the 10×6 block supplied by the filter select and downsampling module 204. The resulting pixel values are supplied to the reference frame memory 218 for storage. The input to the adder 226 from the filter selection and downsample module 224 is forced to zero in the case where the 10×6 block from the filter select and downsampling module 204 is an I frame.

The size of a full resolution HDTV frame is 1920×1088, whereas a reference downsampled frame used by the decoder 200 is 720×680. In order to properly display the downsampled frames, they must be resampled. There are many ways to do this resampling in a resize frame module 228. Two possible methods are described below.

One of the simplest ways to resample a reference frame is on a block by block basis. The resize frame module 228 upsamples each 5×3 block horizontally and vertically, referencing the map 214. Then, the resize frame module 228 downsamples each 8×8 microblock horizontally and vertically using a four point DCT truncation. Using a very small amount of memory (≈0.003% of the full resolution decoder memory), this upsampling and downsampling will result in a 960×544 frame that can be viewed for many applications.

A second way to resample a reference frame is to use continuous filters. The continuous filters help to reduce block artifacts. In this particular case, the reference frame is resampled so that it can be viewed on an NTSC television. The resize module 228 upsamples each 5×3 block horizontally and vertically referencing the Map 214. Then, the resize module 228 downsamples the 1920×1088 frame to an 852× 480 frame. Using a small amount of memory (≈0.03% of the full resolution decoder memory), this 852×480 frame can be viewed on an NTSC television. To properly vertically downsample 1088 lines into 480 lines, different phase shifting filters are applied to the top field and to the bottom field. The top field filters are called Filter A and the bottom field filters are called Filter B. An exemplary Filter A is suggested as follows:

$$\begin{bmatrix} a & b & c & d & e & 0 & 0 & 0 & 0 & 0 & 0 & 0 & 0 \\ 0 & 0 & f & g & h & i & j & k & 0 & 0 & 0 & 0 & 0 \\ 0 & 0 & 0 & 0 & l & m & n & o & p & q & 0 & 0 & 0 \\ 0 & 0 & 0 & 0 & 0 & 0 & r & s & t & u & v & w & 0 \end{bmatrix}$$

where a=e=−0.021694, b=d=0.228379, c=0.586631, f=w=−0.023157, g=v=0.116962, h=u=0.558908, i=t=0.356491, j=s=−0.004185, k=r=−0.005018, l=q=−0.015281, m=p=0.037548, n=o=0.477733. An exemplary Filter B is suggested follows:

$$\begin{bmatrix} a & b & c & d & e & f & 0 & 0 & 0 & 0 & 0 & 0 & 0 \\ 0 & 0 & g & h & i & j & k & l & 0 & 0 & 0 & 0 & 0 \\ 0 & 0 & 0 & 0 & m & n & o & p & q & r & 0 & 0 & 0 \\ 0 & 0 & 0 & 0 & 0 & 0 & s & t & u & v & w & x & 0 \end{bmatrix}$$

where a=x=−0.009954, b=w=0.013182, c=v=0.420096, d=u=0.524693, e=t=0.071972, f=s=−0.019988, g=r=−0.001414, h=q=−0.015450, i=p=0.291419, j=o=0.579660, k=n=0.169765, l=m=−0.023981.

Figure 13:
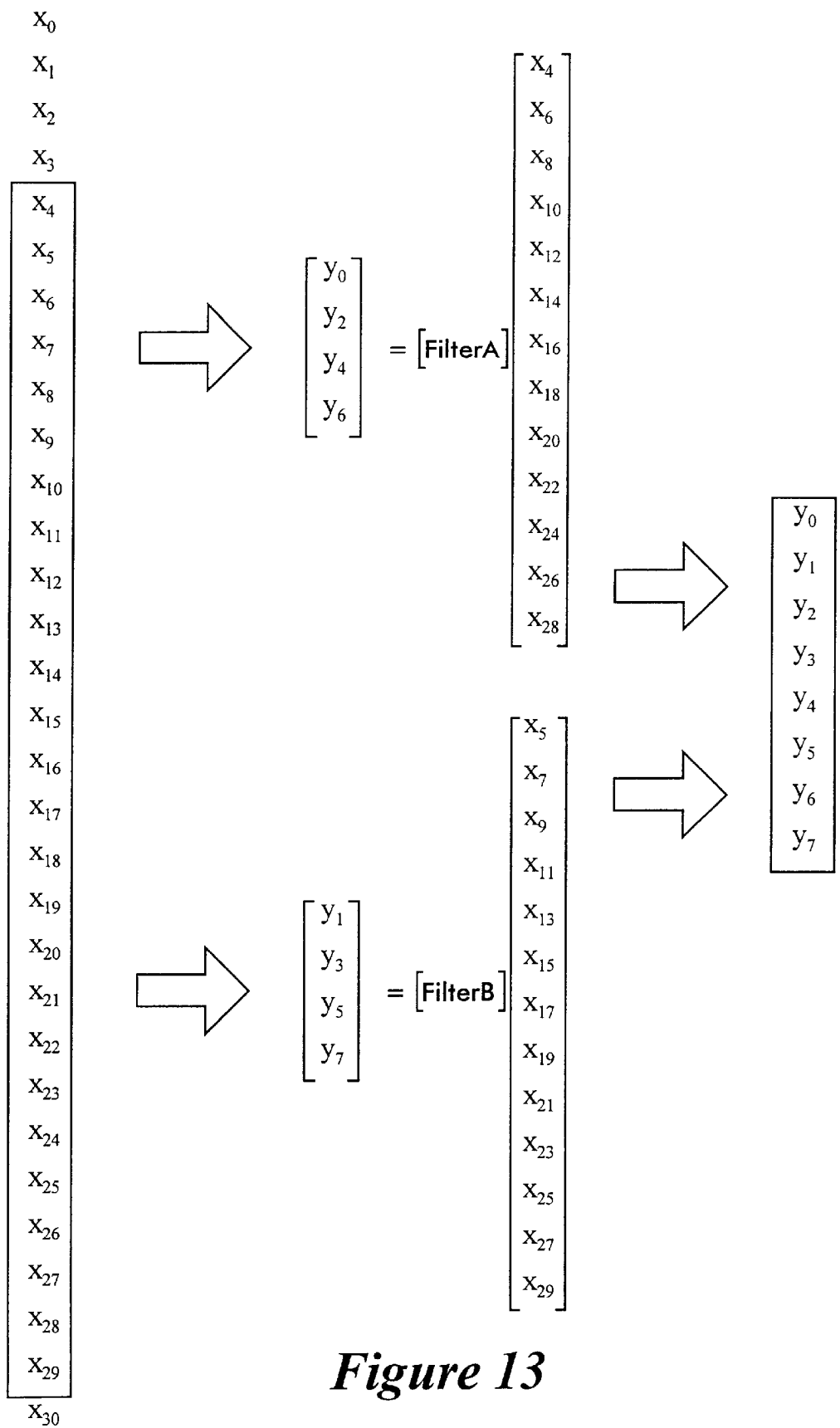
FIGS. 13–16 show sets of pixel data useful in describing the second embodiment of the present invention.
Figure 14:
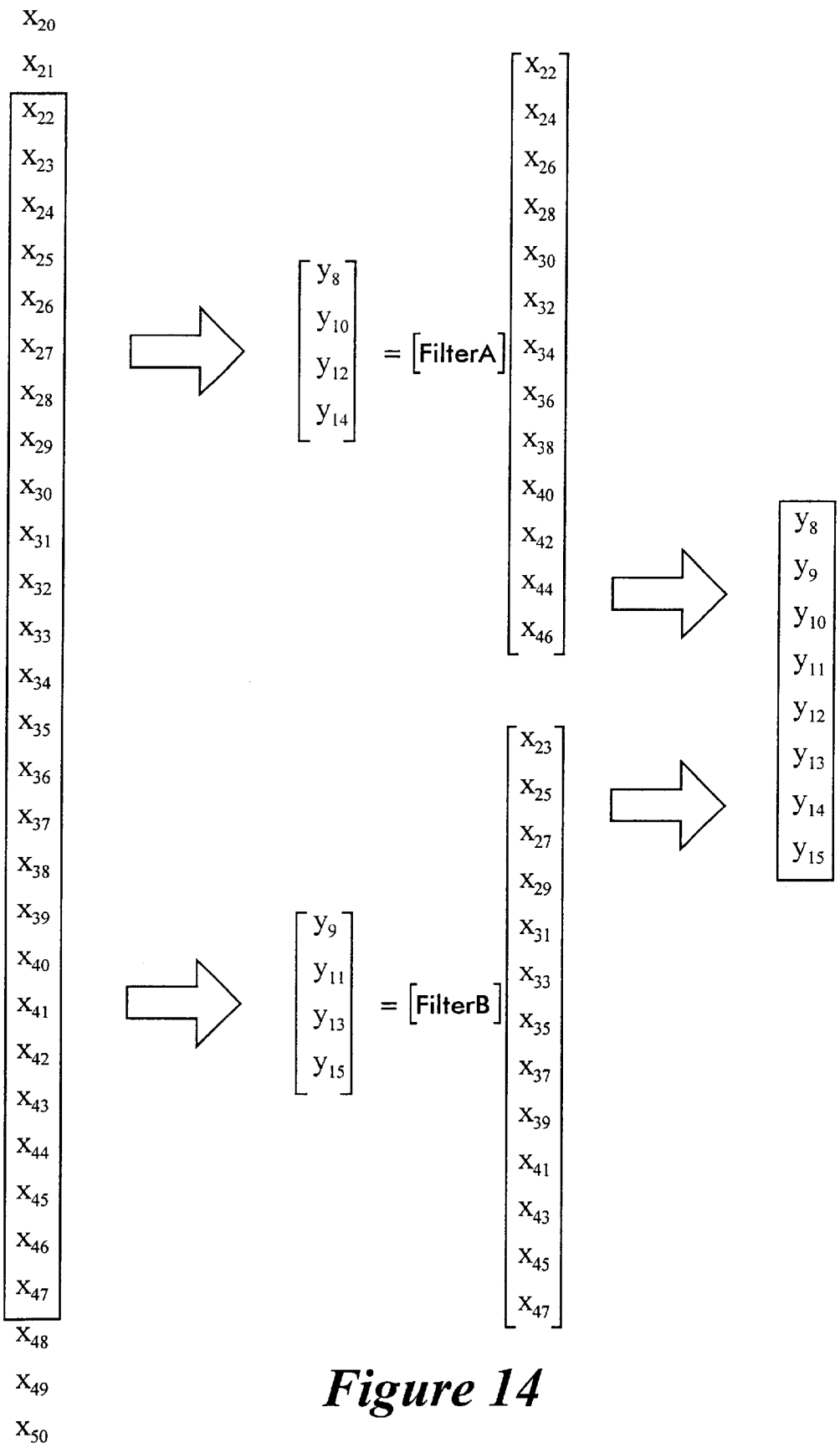

In describing an exemplary application of Filters A and B, it is useful to consider the one dimensional case. Given vertical pixels $x_0$ through $x_{1087}$, Filters A and B are applied to pixels $x_4$ through $x_{29}$ (each filter being applied to thirteen pixels) to create downsampled pixels $y_0$ through $y_7$ as shown in FIG. 13. Then, Filters A and B are applied in an overlapping manner to pixels $x_{22}$ through $x_{47}$ (each filter again being applied to thirteen pixels) to create downsampled pixels $y_8$ through $y_{15}$ as shown in FIG. 14. This process is repeated until vertically downsampled pixels $y_0$ through $y_{479}$ are created for all 1920 columns. The above processes are easily extended for the two dimensional case by replacing the vectors in FIGS. 13 and 14 with matrices.

Figure 15:
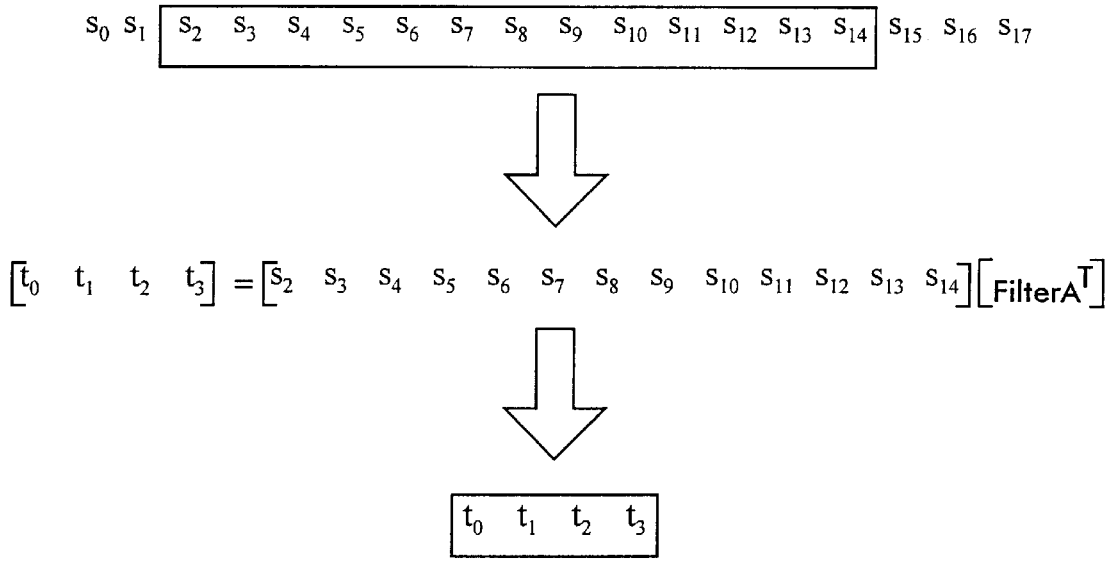
Figure 16:
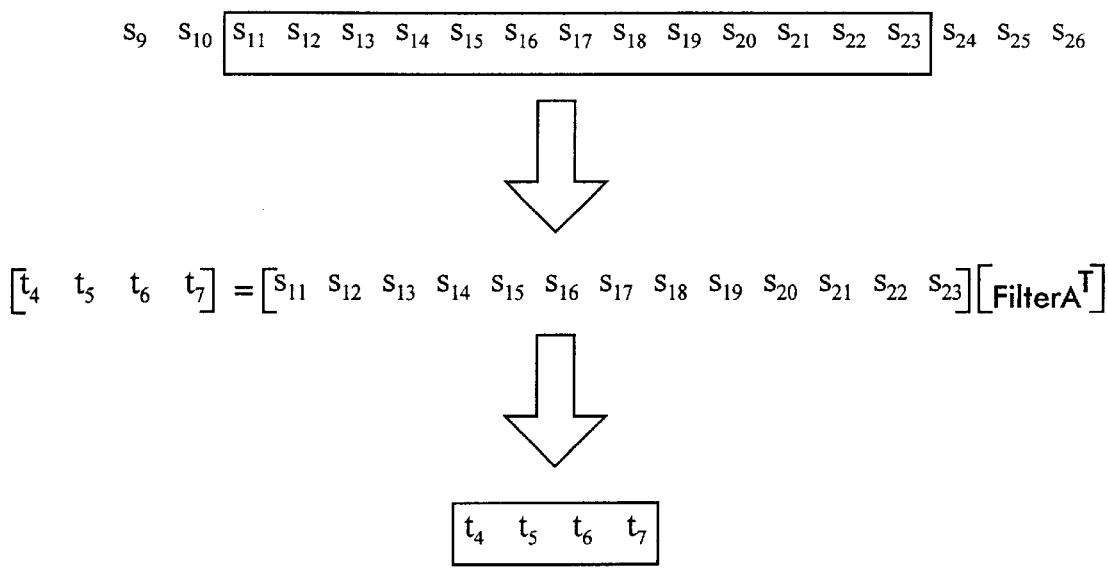

Horizontal downsampling is performed in a similar way except that only Filter A is applied because horizontal pixels are not interlaced. Thus, given horizontal pixels $s_0$ through $s_{1919}$, Filter A is applied to pixels $s_2$ through $s_{14}$ to create downsampled pixels $t_0$ through $t_3$ as shown in FIG. 15. Then, Filter A is applied in an overlapping manner to pixels $s_{11}$ through $s_{23}$ to create downsampled pixels $t_4$ through $t_7$ as shown in FIG. 16. This process is repeated until horizontally downsampled pixels $t_0$ through $t_{852}$ are created for all 480 rows. Again, the above processes are easily extended for the two dimensional case by replacing the vectors in FIGS. 15 and 16 with matrices.

Certain modifications of the present invention have been discussed above. Other modifications will occur to those practicing in the art of the present invention. Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A method of downsampling a received picture to a lower resolution comprising:
   a) horizontally downsampling the received picture;
   b) calculating at least first and second errors, wherein the first error is calculated based upon the received picture and a downsampled/upsampled version of the received picture derived from a first vertical downsampling filter, and wherein the second error is calculated based upon the received picture and a downsampled/upsampled version of the received picture derived from a second vertical downsampling filter;
   c) vertically downsampling the received picture using the first vertical downsampling filter if the first error is less than the second error; and,
   d) vertically downsampling the received picture using the second vertical downsampling filter if the second error is less than the first error.

2. The method of claim 1 wherein motion compensation is applied to the horizontally and vertically downsampled received picture.

3. The method of claim 2 wherein the motion compensation is based upon the one of the first and second vertical downsampling filters used to vertically downsample the received picture.

4. The method of claim 2 wherein the motion compensation comprises upsampling and downsampling of a reference picture based upon the one of the first and second vertical downsampling filters used to vertically downsample the received picture.

5. The method of claim 4 wherein the upsampling of the reference picture involves use of an inverse of the one of the first and second vertical downsampling filters, and wherein the downsampling of the reference picture involves use of the one of the first and second vertical downsampling filters.

6. The method of claim 5 wherein the inverse comprises a Moore-Penrose inverse.

7. The method of claim 1 wherein the horizontal and vertical downsampling are applied to blocks of the received picture, wherein the first error is calculated based upon a first one of the blocks of the received picture and a downsampled/upsampled version of the first block derived from the first vertical downsampling filter, and wherein the second error is calculated based upon the first block and a downsampled/upsampled version of the first block derived from the second vertical downsampling filter.

8. The method of claim 7 wherein the first block is divided into at least first and second sub-blocks, wherein the first vertical downsampling filter is saved if the first error is smaller than the second error, wherein the second vertical downsampling filter is saved if the second error is smaller than the first error, wherein a third error is calculated based upon the first sub-block and a downsampled/upsampled version of the first sub-block derived from a third vertical downsampling filter, wherein a fourth error is calculated based upon the first sub-block and a downsampled/upsampled version of the first sub-block derived from a fourth vertical downsampling filter, wherein the third vertical downsampling filter is saved in connection with the first sub-block if the third error is smaller than the fourth error, wherein the fourth vertical downsampling filter is saved in connection with the first sub-block if the fourth error is smaller than the third error, wherein a fifth error is calculated based upon the second sub-block and a downsampled/ upsampled version of the second sub-block derived from the third vertical downsampling filter, wherein a sixth error is calculated based upon the second sub-block and a downsampled/upsampled version of the second sub-block derived from the fourth vertical downsampling filter, wherein the third vertical downsampling filter is saved in connection with the second sub-block if the fifth error is smaller than the sixth error, wherein the fourth vertical downsampling filter is saved in connection with the second sub-block if the sixth error is smaller than the fifth error, wherein a summed error is formed between the smaller of the third and fourth errors and the smaller of the fifth and sixth errors, wherein the saved one of the first and second vertical downsampling filters is saved if the error corresponding to the saved one of the first and second filters is smaller than the summed error, wherein the one of the third and fourth vertical downsampling filters saved in connection with the first sub-block and the one of the third and fourth vertical downsampling filters saved in connection with the second sub-block are saved if the summed error is smaller than the error corresponding to the saved one of the first and second filters, and wherein the first and second sub-blocks are vertically downsampled according to the ones of the first, second, third, and fourth vertical downsampling filters saved in connection therewith.

9. The method of claim 1 wherein the received picture is divided into at least first and second blocks, wherein the first error is calculated based upon the first block and a downsampled/upsampled version of the first block derived from the first vertical downsamplIng filter, wherein the second error is calculated based upon the first block and a downsampled/upsampled version of the first block derived from the second vertical downsampling filter, wherein the first vertical downsampling filter is saved in connection with the first block if the first error is smaller than the second error, wherein the second vertical downsampling filter is saved in connection with the first block if the second error is smaller than the first error, wherein a third error is calculated based upon the second block and a downsampled/ upsampled version of the second block derived from the first vertical downsampling filter, wherein a fourth error is calculated based upon the second block and a downsampled/ upsampled version of the second block derived from the second vertical downsampling filter, wherein the first vertical downsampling filter is saved in connection with the second block if the third error is smaller than the fourth error, wherein the second vertical downsampling filter is saved in connection with the second block if the fourth error is smaller than the third error, vertically downsampling the first block according to the one of the first and second vertical downsampling filters saved in connection with the first block, and vertically downsampling the second block according to the one of the first and second vertical downsampling filters saved in connection with the second block.

10. The method of claim 1 wherein the horizontal and vertical downsampling operates on a block having a width and a height such that the horizontal downsampling reduces the block width by 50% and such that the vertical downsampling reduces the block height by 50%.

11. The method of claim 10 wherein the width and height are equal.

12. The method of claim 1 wherein the horizontal and vertical downsampling operates on a block having a width and a height such that the horizontal and vertical downsampling reduces one of the block width and height by ⅝ and the other of the block width and height by ⅜.

13. The method of claim 12 wherein the width and height are equal.

14. The method of claim 1 wherein the horizontal and vertical downsampling operates on a block having a width and a height such that the horizontal and vertical downsampling reduces one of the block width and height by a/b and the other of the block width and height by (b−a)/b, wherein a≠b, and wherein a≠b/2.

15. The method of claim 14 wherein the width and height are equal.

16. The method of claim 1 wherein the first error is a first sum squared error SSE1 determined through application of the first vertical downsampling filter, and wherein the second error is a second sum squared error SSE2 determined through application of the second vertical downsampling filter.

17. The method of claim 16 wherein the first sum squared error SSE1 is determined according to the following equations:

$$SSE1 = \sum_y \sum_x [orig(x, y) - pred1(x, y)]^2$$

$$pred1(x,y) = u1 * d1 * orig(x,y)$$

wherein the second sum squared error SSE2 is determined according to the following equations $$SSE2 = \sum_y \sum_x [orig(x, y) - pred2(x, y)]^2$$

$$pred2(x,y) = u2 * d2 * orig(x,y)$$

wherein x and y specify pixel coordinates, wherein orig (x,y) are pixels values in the received picture, wherein pred1 (x,y) are pixel values in the downsampled/upsampled version of the original picture derived from the first vertical downsampling filter, wherein pred2 (x,y) are pixel values in the downsampled/upsampled version of the original picture derived from the second vertical downsampling filter, wherein d1 is the first vertical downsampling filter, wherein u1 is an upsampling filter determined from d1, wherein d2 is the second vertical downsampling filter, and wherein u2 is an upsampling filter determined from d2.

18. The method of claim 1 wherein the horizontal and vertical downsampling are applied to a block of the received picture, wherein the block is divided into at least first and second sub-blocks, wherein the block is processed by the first and second vertical downsampling filters to produce the first and second errors, wherein the first sub-block is processed by third and fourth vertical downsampling filters to produce third and fourth errors, wherein the second sub-block is processed by fifth and sixth vertical downsampling filters to produce fifth and sixth errors, and wherein the block is vertically downsampled by one or more of the first, second, third, fourth, fifth, and sixth vertical downsampling filters depending upon which combination of the first, second, third, fourth, fifth, and sixth vertical downsampling filters produces the smallest combination of the first, second, third, fourth, fifth, and sixth errors.

19. The method of claim 18 wherein the third vertical dowmsampling filter equals the fifth vertical downsampling filter, and wherein the fourth vertical dowmsampling filter equals the sixth vertical downsampling filter.

20. A downsampling apparatus that downsamples a picture being processed comprising an error calculation module that calculates first and second errors, wherein the first error is calculated based upon a difference between the picture being processed and a first version of the picture being processed derived from a first downsampling filter, and wherein the second error is calculated based upon a difference between the picture being processed and a second version of the picture being processed derived from a second downsampling filter, the downsampling apparatus also comprising a filtering module that downsamples the picture being processed using the first downsampling filter if the first error is less than the second error and that downsamples the picture being processed using the second downsampling filter if the second error is less than the first error.

21. The downsampling apparatus of claim 20 wherein the filtering module is arranged to horizontally downsample the picture being processed.

22. The downsampling apparatus of claim 20 wherein the filtering module is arranged to vertically downsample the picture being processed.

23. The downsampling apparatus of claim 20 wherein the filtering module is arranged to horizontally and vertically downsample the picture being processed.

24. The downsampling apparatus of claim 20 wherein the filtering module comprises a motion compensator that applies motion compensation to the downsampled picture being processed.

25. The downsampling apparatus of claim 24 wherein the motion compensator is based upon the one of the first and second downsampling filters used to downsample the picture being processed.

26. The downsampling apparatus of claim 24 wherein the motion compensator upsamples and downsamples a reference picture based upon the one of the first and second downsampling filters used to downsample the picture being processed.

27. The downsampling apparatus of claim 26 wherein the upsampling of the reference picture involves use of an inverse of the one of the first and second downsampling filters, and wherein the downsampling of the reference picture involves use of the one of the first and second downsampling filters.

28. The downsampling apparatus of claim 27 wherein the inverse comprises a Moore-Penrose inverse.

29. The downsampling apparatus of claim 20 wherein the downsampling is applied to blocks of the picture being processed, wherein the first error is calculated based upon a first one of the blocks of the picture being processed and a version of the first block derived from the first downsampling filter, and wherein the second error is calculated based upon the first block and a version of the first block derived from the second downsampling filter.

30. The downsampling apparatus of claim 29 wherein the first block is divided into at least first and second sub-blocks, wherein the first downsampling filter is saved if the first error is smaller than the second error, wherein the second downsampling filter is saved if the second error is smaller than the first error, wherein a third error is calculated based upon the first sub-block and a version of the first sub-block derived from a third downsampling filter, wherein a fourth error is calculated based upon the first sub-block and a version of the first sub-block derived from a fourth downsampling filter, wherein the third downsampling filter is saved in connection with the first sub-block if the third error is smaller than the fourth error, wherein the fourth downsampling filter is saved in connection with the first sub-block if the fourth error is smaller than the third error, wherein a fifth error is calculated based upon the second sub-block and a version of the second sub-block derived from the third downsampling filter, wherein a sixth error is calculated based upon the second sub-block and a version of the second sub-block derived from the fourth downsampling filter, wherein the third downsampling filter is saved in connection with the second sub-block if the fifth error is smaller than the sixth error, wherein the fourth downsampling filter is saved in connection with the second sub-block if the sixth error is smaller than the fifth error, wherein a summed error is formed between the smaller of the third and fourth errors and the smaller of the fifth and sixth errors, wherein the saved one of the first and second downsampling filters is saved if the error corresponding to the saved one of the first and second filters is smaller than the summed error, wherein the one of the third and fourth downsampling filters saved in connection with the first sub-block and the one of the third and fourth downsampling filters saved in connection with the second sub-block are saved if the summed error is smaller than the error corresponding to the saved one of the first and second downsampling filters, and wherein the filtering module downsamples the first and second sub-blocks according to the ones of the first, second, third, and fourth downsampling filters saved in connection therewith.

31. The downsampling apparatus of claim 20 wherein the picture being processed is divided into at least first and second blocks, wherein the first error is calculated based upon the first block and a version of the first block derived from the first downsampling filter, wherein the second error is calculated based upon the first block and a version of the first block derived from the second downsampling filter, wherein the first downsampling filter is saved in connection with the first block if the first error is smaller than the second error, wherein the second downsampling filter is saved in connection with the first block if the second error is smaller than the first error, wherein a third error is calculated based upon the second block and a version of the second block derived from the first downsampling filter, wherein a fourth error is calculated based upon the second block and a version of the second block derived from the second downsampling filter, wherein the first downsampling filter is saved in connection with the second block if the third error is smaller than the fourth error, wherein the second downsampling filter is saved in connection with the second block if the fourth error is smaller than the third error, wherein the filtering module downsamples the first block according to the one of the first and second downsampling filters saved in connection with the first block, and wherein the filtering module downsamples the second block according to the one of the first and second downsampling filters saved in connection with the second block.

32. The downsampling apparatus of claim 20 wherein the filtering module downsamples a block having a size such that the downsampling reduces the block size by 50%.

33. The downsampling apparatus of claim 20 wherein the filtering module downsamples a block having a size such that the downsampling reduces the block size by $5/8$ in one direction and such that the downsampling reduces the block size by $3/8$ in another direction.

34. The downsampling apparatus of claim 33 wherein the block size is equal in both directions.

35. The downsampling apparatus of claim 20 wherein the filtering module downsamples a block having a size such that the block size is reduced by a/b, wherein a≠b, and wherein a≠b/2.

36. The downsampling apparatus of claim 20 wherein the first error is a first sum squared error SSE1 determined through application of the first downsampling filter, and wherein the second error is a second sum squared error SSE2 determined through application of the second downsampling filter.

37. The downsampling apparatus of claim 36 wherein the first sum squared error SSE1 is determined according to the following equations:

$$SSE1 = \sum_y \sum_x [orig(x, y) - pred1(x, y)]^2$$

$$pred1(x,y) = u1 * d1 * orig(x,y)$$

wherein the second sum squared error SSE2 is determined according to the following equations:

$$SSE2 = \sum_y \sum_x [orig(x, y) - pred2(x, y)]^2$$

$$pred2(x,y) = u2 * d2 * orig(x,y)$$

wherein x and y specify pixel coordinates, wherein orig (x,y) are pixels values in the picture being processed, wherein pred1 (x,y) are pixel values in the version of the picture being processed derived from the first downsampling filter, wherein pred2 (x,y) are pixel values in the version of the picture being processed derived from the second downsampling filter, wherein d1 is the first downsampling filter, wherein u1 is an upsampling filter determined from d1, wherein d2 is the second downsampling filter, and wherein u2 is an upsampling filter determined from d2.

38. The downsampling apparatus of claim 20 wherein the downsampling is applied to a block of the picture being processed, wherein the block is divided into at least first and second sub-blocks, wherein the block is processed by the first and second downsampling filters to produce the first and second errors, wherein the first sub-block is processed by third and fourth downsampling filters to produce third and fourth errors, wherein the second sub-block is processed by fifth and sixth downsampling filters to produce fifth and sixth errors, and wherein the block is downsampled by one or more of the first, second, third, fourth, fifth, and sixth downsampling filters depending upon which combination of the first, second, third, fourth, fifth, and sixth filters produces the smallest combination of the first, second, third, fourth, fifth, and sixth errors.

39. The downsampling apparatus of claim 38 wherein the third dowmsampling filter equals the fifth downsampling filter, and wherein the fourth dowmsampling filter equals the sixth downsampling filter.

40. A downsampling apparatus that converts a received DCT coefficient macroblock to a reconstructed pixel block comprising:

an IDCT module that performs an inverse DCT on the received DCT coefficient macroblock to produce a first intermediate block;

a horizontal downsampler that horizontally downsamples the first intermediate block to produce a second intermediate block;

a calculation module that calculates first and second errors, the first error being calculated based upon a difference between one of the first and second intermediate blocks and a first downsampled/upsampled version of the one of the first and second intermediate blocks derived from a first vertical downsampling filter, and the second error being calculated based upon a difference between the one of the first and second intermediate blocks and a second downsampled/upsampled version of the one of the first and second intermediate blocks derived from a second vertical downsampling filter;

a filtering module that vertically downsamples the second intermediate block using the first vertical downsampling filter if the first error is less than the second error and that vertically downsamples the second intermediate block using the second vertical downsampling filter if the second error is less than the first error; and, a motion compensator that adds prediction reference pixels to the horizontally and vertically downsampled block, as appropriate, to form reconstructed pixels.

41. The downsampling apparatus of claim 40 wherein the motion compensator adds the prediction reference pixels based upon the one of the first and second vertical downsampling filters applied by the filtering module.

42. The downsampling apparatus of claim 40 wherein the motion compensator upsamples and downsamples a reference picture based upon the one of the first and second vertical downsampling filters applied by the filtering module.

43. The downsampling apparatus of claim 42 wherein the upsampling of the reference picture involves use of an inverse of the one of the first and second vertical downsampling filters applied by the filtering module, and wherein the downsampling of the reference picture involves use of the one of the first and second vertical downsampling filters applied by the filtering module.

44. The downsampling apparatus of claim 43 wherein the inverse comprises a Moore-Penrose inverse.

45. The downsampling apparatus of claim 40 wherein the one of the first and second intermediate blocks is divided into at least first and second sub-blocks, wherein the first vertical downsampling filter is saved if the first error is smaller than the second error, wherein the second vertical downsampling filter is saved if the second error is smaller than the first error, wherein a third error is calculated based upon the first sub-block and a downsampled/upsampled version of the first sub-block derived from a third vertical downsampling filter, wherein a fourth error is calculated based upon the first sub-block and a downsampled/upsampled version of the first sub-block derived from a fourth vertical downsampling filter, wherein the third vertical downsampling filter is saved in connection with the first sub-block if the third error is smaller than the fourth error, wherein the fourth vertical downsampling filter is saved in connection with the first sub-block if the fourth error is smaller than the third error, wherein a fifth error is calculated based upon the second sub-block and a downsampled/upsampled version of the second sub-block derived from the third vertical downsampling filter, wherein a sixth error is calculated based upon the second sub-block and a downsampled/upsampled version of the second sub-block derived from the fourth vertical downsampling filter, wherein the third vertical downsampling filter is saved in connection with the second sub-block if the fifth error is smaller than the sixth error, wherein the fourth vertical downsampling filter is saved in connection with the second sub-block if the sixth error is smaller than the fifth error, wherein a summed error is formed between the smaller of the third and fourth errors and the smaller of the fifth and sixth errors, wherein the saved one of the first and second vertical downsampling filters is saved if the error corresponding to the saved one of the first and second filters is smaller than the summed error, wherein the one of the third and fourth vertical downsampling filters saved in connection with the first sub-block and the one of the third and fourth vertical downsampling filters saved in connection with the second sub-block are saved if the summed error is smaller than the error corresponding to the saved one of the first and second filters, and wherein the filtering module vertically downsamples the first and second sub-blocks according to the ones of the first, second, third, and fourth vertical downsampling filters saved in connection therewith.

46. The downsampling apparatus of claim 40 wherein the one of the first and second intermediate blocks is divided into at least first and second smaller blocks, wherein the first error is calculated based upon the first smaller block and a downsampled/upsampled version of the first smaller block derived from the first vertical downsampling filter, wherein the second error is calculated based upon the first smaller block and a downsampled/upsampled version of the first smaller block derived from the second vertical downsampling filter, wherein the first vertical downsampling filter is saved in connection with the first smaller block if the first error is smaller than the second error, wherein the second vertical downsampling filter is saved in connection with the first smaller block if the second error is smaller than the first error, wherein a third error is calculated based upon the second smaller block and a downsampled/upsampled version of the second smaller block derived from the first vertical downsampling filter, wherein a fourth error is calculated based upon the second smaller block and a downsampled/upsampled version of the second smaller block derived from the second vertical downsampling filter, wherein the first vertical downsampling filter is saved in connection with the second smaller block if the third error is smaller than the fourth error, wherein the second vertical downsampling filter is saved in connection with the second smaller block if the fourth error is smaller than the third error, wherein the filtering module vertically downsamples the first smaller block according to the one of the first and second vertical downsampling filters saved in connection with the first smaller block, and wherein the filtering module vertically downsamples the second smaller block according to the one of the first and second vertical downsampling filters saved in connection with the second smaller block.

47. The downsampling apparatus of claim 40 wherein the first intermediate block has a width and a height such that the horizontal downsampling reduces the width by 50% and such that the vertical downsampling reduces the height by 50%.

48. The downsampling apparatus of claim 47 wherein the width and height are equal.

49. The downsampling apparatus of claim 40 wherein the first intermediate block has a width and a height such that horizontal downsampling reduces one of the width and height by ⅝ and such that vertical downsampling reduces the other of the width and height by ⅜.

50. The downsampling apparatus of claim 49 wherein the width and height are equal.

51. The downsampling apparatus of claim 40 wherein the first intermediate block has a width and a height such that horizontal downsampling reduces one of the width and height by a/b and such that vertical downsampling reduces the other of the width and height by (b−a)/b, wherein a≠b, and wherein a≠b/2.

52. The downsampling apparatus of claim 51 wherein the width and height are equal.

53. The downsampling apparatus of claim 40 wherein the first error is a first sum squared error SSE1 determined through application of the first vertical downsampling filter, and wherein the second error is a second sum squared error SSE2 determined through application of the second vertical downsampling filter.

54. The downsampling apparatus of claim 53 wherein the first sum squared error SSE1 is determined according to the following equations:

$$SSE1 = \sum_y \sum_x [orig(x, y) - pred1(x, y)]^2$$

$$pred1(x,y) = u1 * d1 * orig(x,y)$$

wherein the second sum squared error SSE2 is determined according to the following equations:

$$SSE2 = \sum_y \sum_x [orig(x, y) - pred2(x, y)]^2$$

$$pred2(x,y) = u2 * d2 * orig(x,y)$$

wherein x and y specify pixel coordinates, wherein orig (x,y) are pixel values in the first intermediate block, wherein pred1 (x,y) are pixel values in the downsampled/upsampled version of the first intermediate block derived from the first vertical downsampling filter, wherein pred2 (x,y) are pixel values in the downsampled/upsampled version of the first intermediate block derived from the second vertical downsampling filter, wherein d1 is the first vertical downsampling filter, wherein u1 is an upsampling filter determined from d1, wherein d2 is the second vertical downsampling filter, and wherein u2 is an upsampling filter determined from d2.

55. The downsampling apparatus of claim 40 wherein the vertical downsampling is applied to a block of the picture being processed, wherein the block is divided into at least first and second sub-blocks, wherein the block is processed by the first and second vertical downsampling filters to produce the first and second errors, wherein the first sub-block is processed by third and fourth vertical downsampling filters to produce third and fourth errors, wherein the second sub-block is processed by fifth and sixth vertical downsampling filters to produce fifth and sixth errors, and wherein the block is vertical downsampled by one or more of the first, second, third, fourth, fifth, and sixth vertical downsampling filters depending upon which combination of the first, second, third, fourth, fifth, and sixth vertical downsampling filters produces the smallest combination of the first, second, third, fourth, fifth, and sixth errors.

56. The downsampling apparatus of claim 55 wherein the third vertical downsampling filter equals the fifth vertical downsampling filter, and wherein the fourth vertical dowmsampling filter equals the sixth vertical downsampling filter.

* * * * *